(12) United States Patent
Sugiyama et al.

(10) Patent No.: US 10,218,879 B2
(45) Date of Patent: Feb. 26, 2019

(54) PRINT DATA GENERATOR, PRINTER, METHOD, AND COMPUTER-READABLE MEDIUM FOR GENERATING PRINT DATA IN THE HSV COLOR SPACE REDUCING COLORANTS USED

(71) Applicant: Brother Kogyo Kabushiki Kaisha, Nagoya-shi, Aichi-ken (JP)

(72) Inventors: Hiroaki Sugiyama, Nagoya (JP); Akidi Yoshida, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/699,333

(22) Filed: Sep. 8, 2017

(65) Prior Publication Data

US 2018/0091700 A1    Mar. 29, 2018

(30) Foreign Application Priority Data

Sep. 23, 2016    (JP) .................................. 2016-185131

(51) Int. Cl.

| H04N 1/64 | (2006.01) |
|---|---|
| H04N 1/60 | (2006.01) |
| B41J 2/32 | (2006.01) |
| H04N 1/00 | (2006.01) |
| H04N 1/10 | (2006.01) |
| H04N 1/12 | (2006.01) |
| H04N 1/56 | (2006.01) |

(52) U.S. Cl.
CPC ............. *H04N 1/6016* (2013.01); *B41J 2/32* (2013.01); *H04N 1/00037* (2013.01); *H04N 1/0044* (2013.01); *H04N 1/1061* (2013.01); *H04N 1/1215* (2013.01); *H04N 1/56* (2013.01); *H04N 1/6075* (2013.01); *H04N 1/644* (2013.01)

(58) Field of Classification Search
CPC combination set(s) only.
See application file for complete search history.

(56) References Cited

U.S. PATENT DOCUMENTS

| 5,680,230 A | 10/1997 | Kaburagi et al. |
|---|---|---|
| 5,734,484 A | 3/1998 | Yamamoto et al. |

(Continued)

FOREIGN PATENT DOCUMENTS

| JP | H08-84268 A | 3/1996 |
|---|---|---|
| JP | 3210099 B2 | 9/2001 |
| JP | 2008-067068 A | 3/2008 |

*Primary Examiner* — Barbara D Reinier
(74) *Attorney, Agent, or Firm* — Banner & Witcoff, Ltd.

(57) ABSTRACT

A print data generator includes a storage storing processor-executable instructions causing a processor to perform a process to generate print data from original full-color data. The process includes when a hue value of a pixel is within a specific hue range for an emphasis color, setting a density value of a reference color of the pixel based on a value value of the pixel, and setting a density of the emphasis color of the pixel based on a saturation value of the pixel and a difference value between the hue value of the pixel and a hue value of the emphasis color, and when the hue value of the pixel is out of the specific hue range, setting the density value of the reference color based on a luminance value of the pixel derived from RGB data, and setting the density value of the emphasis color to zero.

17 Claims, 14 Drawing Sheets

(56) References Cited

U.S. PATENT DOCUMENTS

| | | | | |
|---|---|---|---|---|
| 6,559,975 B1* | 5/2003 | Tolmer | .................... | H04N 1/56 |
| | | | | 358/1.9 |
| 6,847,377 B2* | 1/2005 | Kitahara | ................ | G06K 15/02 |
| | | | | 345/600 |
| 7,474,446 B2* | 1/2009 | Horiuchi | .................. | H04N 1/56 |
| | | | | 345/589 |
| 7,511,854 B2* | 3/2009 | Yoshikawa | .......... | H04N 1/6052 |
| | | | | 345/601 |
| 7,576,888 B2* | 8/2009 | Sakai | ....................... | H04N 1/56 |
| | | | | 358/1.9 |
| 2008/0013112 A1* | 1/2008 | Yokoyama | ............. | H04N 1/622 |
| | | | | 358/1.2 |
| 2016/0248942 A1* | 8/2016 | Horita | .................. | H04N 1/6019 |

* cited by examiner

PRINT DATA GENERATOR, PRINTER, METHOD, AND COMPUTER-READABLE MEDIUM FOR GENERATING PRINT DATA IN THE HSV COLOR SPACE REDUCING COLORANTS USED

CROSS-REFERENCE TO RELATED APPLICATION

This application claims priority under 35 U.S.C. § 119 from Japanese Patent Application No. 2016-185131 filed on Sep. 23, 2016. The entire subject matter of the application is incorporated herein by reference.

BACKGROUND

Technical Field

The following description relates to aspects of a print data generator, a printer, a method, and a computer-readable medium for generating print data.

Related Art

Heretofore, an image processing apparatus has been known that is configured to generate subtractive color drawing data with the number of colors reduced to two from original full-color data. With respect to each pixel of the original data, the known apparatus calculates density data for black drawing from RGB density data. Based on the RGB density data of each pixel, the known apparatus determines whether each pixel is to be drawn in red or black. To each pixel determined to be drawn in black, the density data for black drawing is applied. To each pixel determined to be drawn in red, density data for red drawing is calculated from the RGB density data and applied. Thus, depending on the determination as to whether each pixel is to be drawn in red or black, the known apparatus generates the density data for red drawing as needed, in addition to the density data for black drawing, for each individual pixel. Hence, it is possible to clearly show, in a printed image, a solidly-painted red area and a solidly-painted black area in an emphasized manner.

SUMMARY

In the known apparatus, the density data for black drawing is determined by a calculation formula to sum respective density values of RGB each weighted with a specific coefficient. Likewise, the density data for red drawing is determined by a calculation formula to sum respective density values of RGB each weighted with a specific coefficient. Nonetheless, with respect to the density data for red drawing, the R density value is weighted with a larger coefficient than the coefficients for the G density value and the B density value. Therefore, a density gradient of pixels to be drawn in red is higher than a density gradient of the whole pixels. Thereby, in an image drawn based on the drawing data generated by the known apparatus, the red color is particularly emphasized in comparison with a grayscale image drawn with a single color based on the original data. Hence, the whole image drawn based on the drawing data generated by the known apparatus might make a user feel more sense of incongruity than the whole grayscale image drawn with the single color based on the original data.

Further, for instance, in an area where a color gradually changes from red to black while a brightness gradually becomes lower from one pixel to the next, a red density gradually becomes higher, and after the color has changed to black, a black density gradually becomes higher. According to the known apparatus, after each pixel is determined to be drawn in red or black, specific density data according to the determination is applied to each pixel. Namely, each individual pixel is previously determined to be drawn in one of red and black. Thereby, a clear boundary is formed between red pixels and black pixels. Thus, the whole image drawn based on the drawing data generated by the known apparatus might make the user feel more sense of incongruity than the whole grayscale image drawn with the single color based on the original data.

Aspects of the present disclosure are advantageous to provide one or more improved techniques that make it possible to obtain a printed image that gives less sense of incongruity than a grayscale image printed based on subtractive color data with the number of colors reduced from full-color data while emphasizing solidly-painted areas each filled with a single color.

According to aspects of the present disclosure, a print data generator is provided that includes a processor, and a storage storing processor-executable instructions configured to, when executed by the processor, cause the processor to perform a print data generating process to generate print data from original full-color data, the print data being expressed with a smaller number of colors including a reference color and an emphasis color, than the original full-color data, the emphasis color being a chromatic color different from the reference color. The print data generating process includes setting one of pixels forming the original full-color data as a target pixel, converting RGB data representing a color of the target pixel into HSV data, calculate a difference value between a hue value of the target pixel in the HSV data and a hue value of the emphasis color, determining whether the hue value of the target pixel is within a specific hue range for the emphasis color, based on the calculated difference value, in response to determining that the hue value of the target pixel is within the specific hue range for the emphasis color, setting a density value of the reference color of the target pixel based on a value value of the target pixel in the HSV data, and setting a density of the emphasis color of the target pixel based on a saturation value of the target pixel in the HSV data and the calculated difference value, and in response to determining that the hue value of the target pixel is out of the specific hue range for the emphasis color, setting the density value of the reference color of the target pixel based on a luminance value of the target pixel derived from the RGB data, and setting the density value of the emphasis color of the target pixel to zero.

According to aspects of the present disclosure, further provided is a printer including a printing head configured to perform printing based on print data, and a print data generator configured to perform a print data generating process to generate the print data from original full-color data, the print data being expressed with a smaller number of colors including a reference color and an emphasis color, than the original full-color data, the emphasis color being a chromatic color different from the reference color. The print data generating process includes setting one of pixels forming the original full-color data as a target pixel, converting RGB data representing a color of the target pixel into HSV data, calculate a difference value between a hue value of the target pixel in the HSV data and a hue value of the emphasis color, determining whether the hue value of the target pixel is within a specific hue range for the emphasis color, based on the calculated difference value, in response to determining that the hue value of the target pixel is within the specific hue range for the emphasis color, setting a density value of the reference color of the target pixel based on a value value of the target pixel in the HSV data, and setting a density of the emphasis color of the target pixel based on a saturation value of the target pixel in the HSV data and the calculated difference value, and in response to determining that the hue value of the target pixel is out of the specific hue range for the emphasis color, setting the density value of the reference color of the target pixel based on a luminance value of the target pixel derived from the RGB data, and setting the density value of the emphasis color of the target pixel to zero.

According to aspects of the present disclosure, further provided is a method implementable on a processor, for generating print data from original full-color data, the print data being expressed with a smaller number of colors including a reference color and an emphasis color, than the original full-color data, the emphasis color being a chromatic color different from the reference color. The method includes setting one of pixels forming the original full-color data as a target pixel, converting RGB data representing a color of the target pixel into HSV data, calculate a difference value between a hue value of the target pixel in the HSV data and a hue value of the emphasis color, determining whether the hue value of the target pixel is within a specific hue range for the emphasis color, based on the calculated difference value, in response to determining that the hue value of the target pixel is within the specific hue range for the emphasis color, setting a density value of the reference color of the target pixel based on a value value of the target pixel in the HSV data, and setting a density of the emphasis color of the target pixel based on a saturation value of the target pixel in the HSV data and the calculated difference value, and in response to determining that the hue value of the target pixel is out of the specific hue range for the emphasis color, setting the density value of the reference color of the target pixel based on a luminance value of the target pixel derived from the RGB data, and setting the density value of the emphasis color of the target pixel to zero.

According to aspects of the present disclosure, further provided is a non-transitory computer-readable medium storing computer-readable instructions configured to, when executed by a processor, cause the processor to perform a print data generating process to generate print data from original full-color data, the print data being expressed with a smaller number of colors including a reference color and an emphasis color, than the original full-color data, the emphasis color being a chromatic color different from the reference color. The print data generating process includes setting one of pixels forming the original full-color data as a target pixel, converting RGB data representing a color of the target pixel into HSV data, calculate a difference value between a hue value of the target pixel in the HSV data and a hue value of the emphasis color, determining whether the hue value of the target pixel is within a specific hue range for the emphasis color, based on the calculated difference value, in response to determining that the hue value of the target pixel is within the specific hue range for the emphasis color, setting a density value of the reference color of the target pixel based on a value value of the target pixel in the HSV data, and setting a density of the emphasis color of the target pixel based on a saturation value of the target pixel in the HSV data and the calculated difference value, and in response to determining that the hue value of the target pixel is out of the specific hue range for the emphasis color, setting the density value of the reference color of the target pixel based on a luminance value of the target pixel derived from the RGB data, and setting the density value of the emphasis color of the target pixel to zero.

BRIEF DESCRIPTION OF THE ACCOMPANYING DRAWINGS

Figure 4:
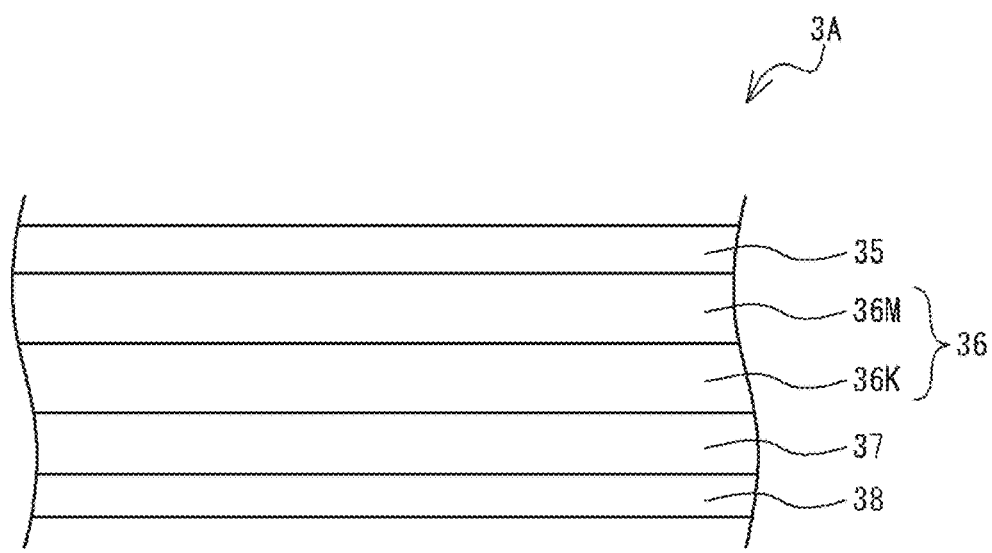

FIG. 4 schematically shows a configuration of a sheet for the printer in the illustrative embodiment according to one or more aspects of the present disclosure.

Figure 5:
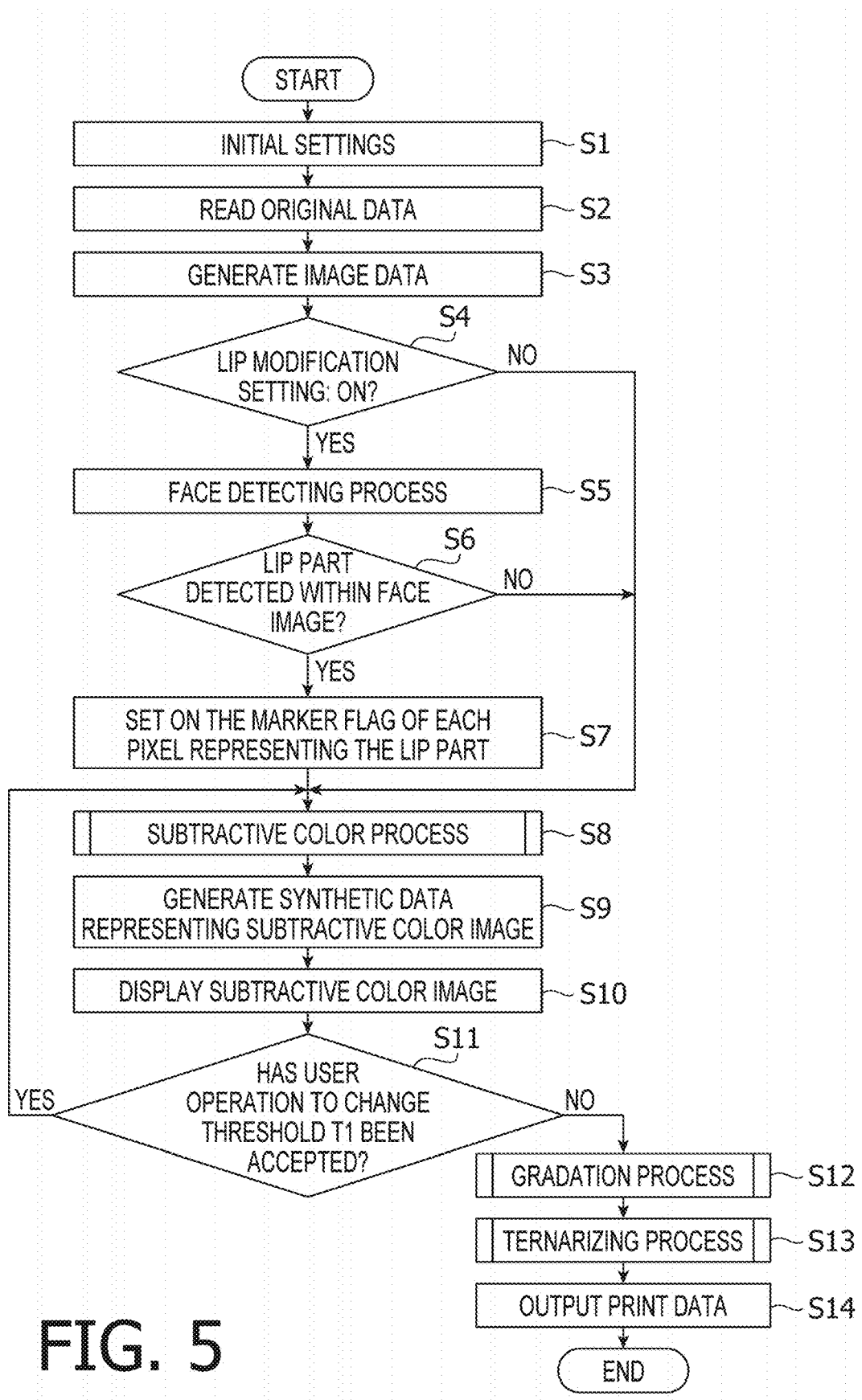

FIG. 5 is a flowchart showing a procedure of a main process to be performed by the PC executing a driver program, in the illustrative embodiment according to one or more aspects of the present disclosure.

Figure 6:
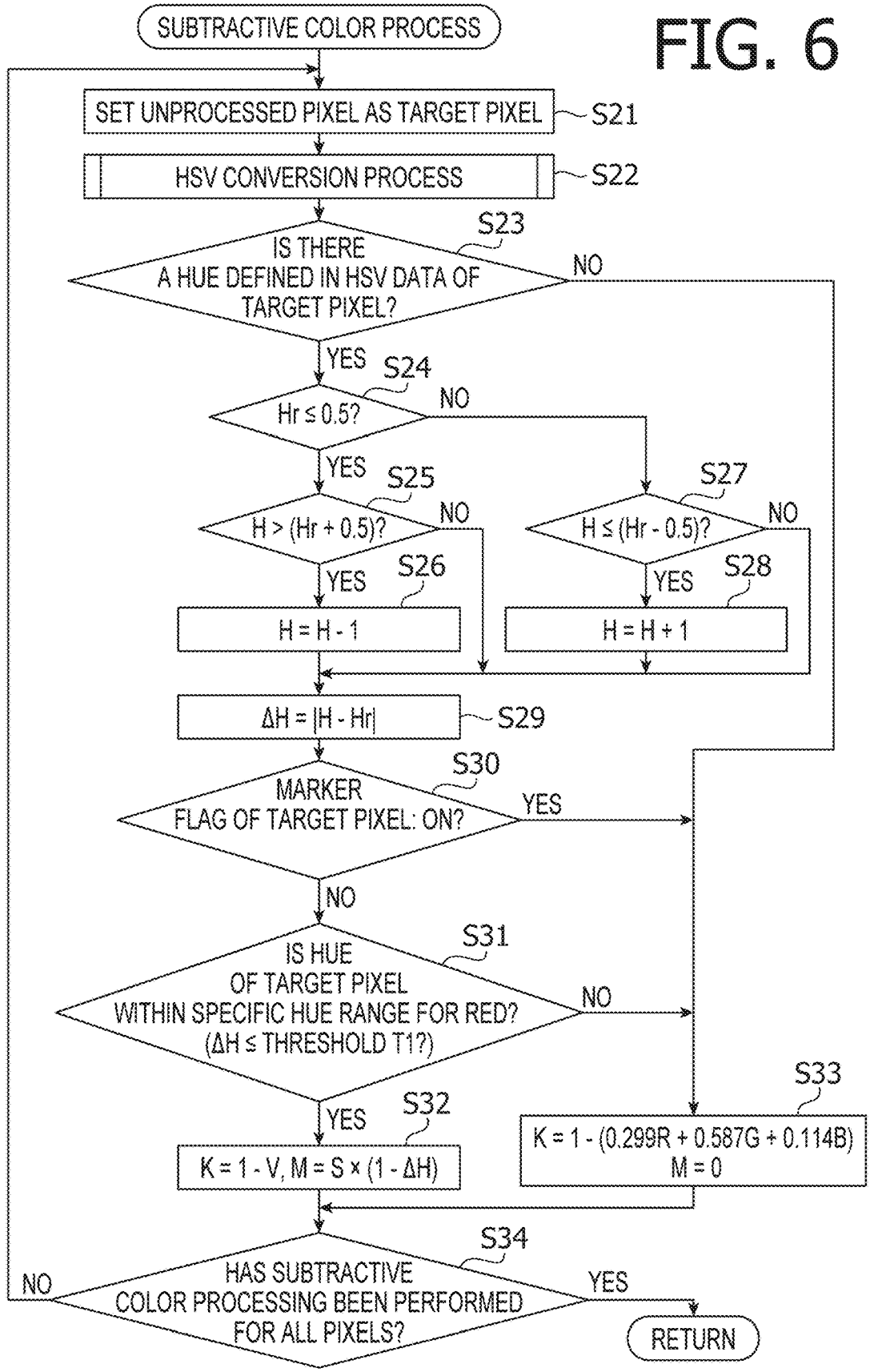

FIG. 6 is a flowchart showing a procedure of a subtractive color process in the illustrative embodiment according to one or more aspects of the present disclosure.

Figure 7:
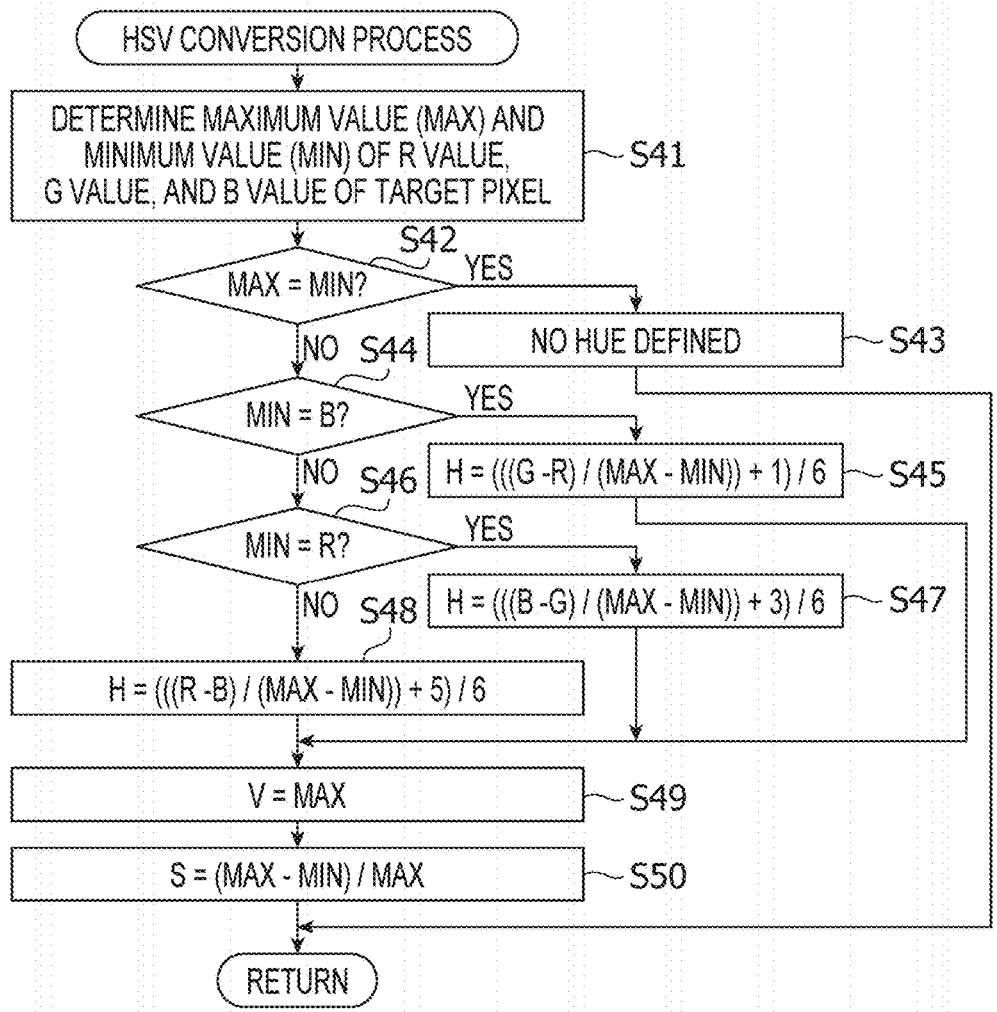

FIG. 7 is a flowchart showing a procedure of an HSV conversion process in the illustrative embodiment according to one or more aspects of the present disclosure.

Figure 8:
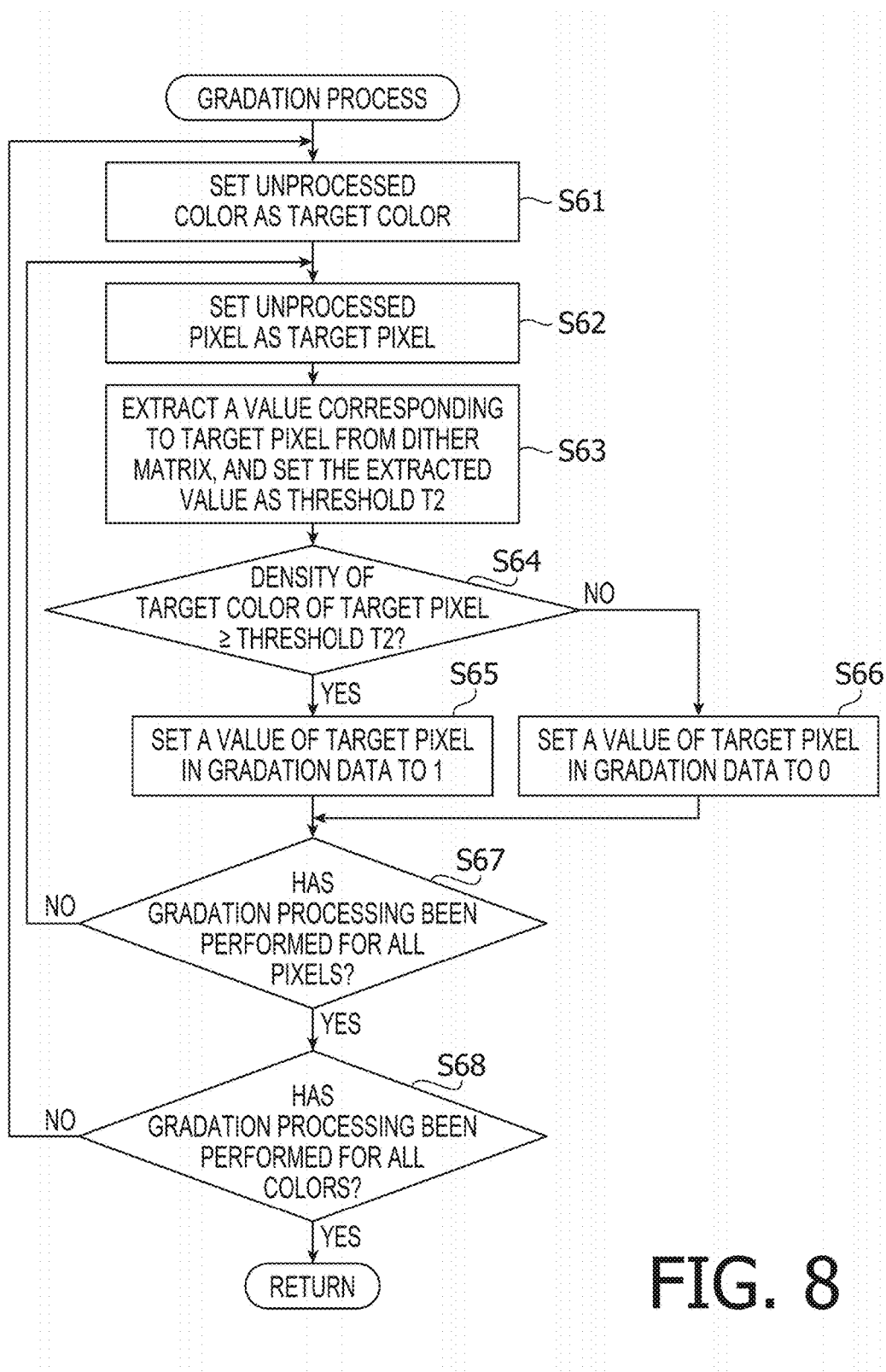

FIG. 8 is a flowchart showing a procedure of a gradation process in the illustrative embodiment according to one or more aspects of the present disclosure.

Figure 9:
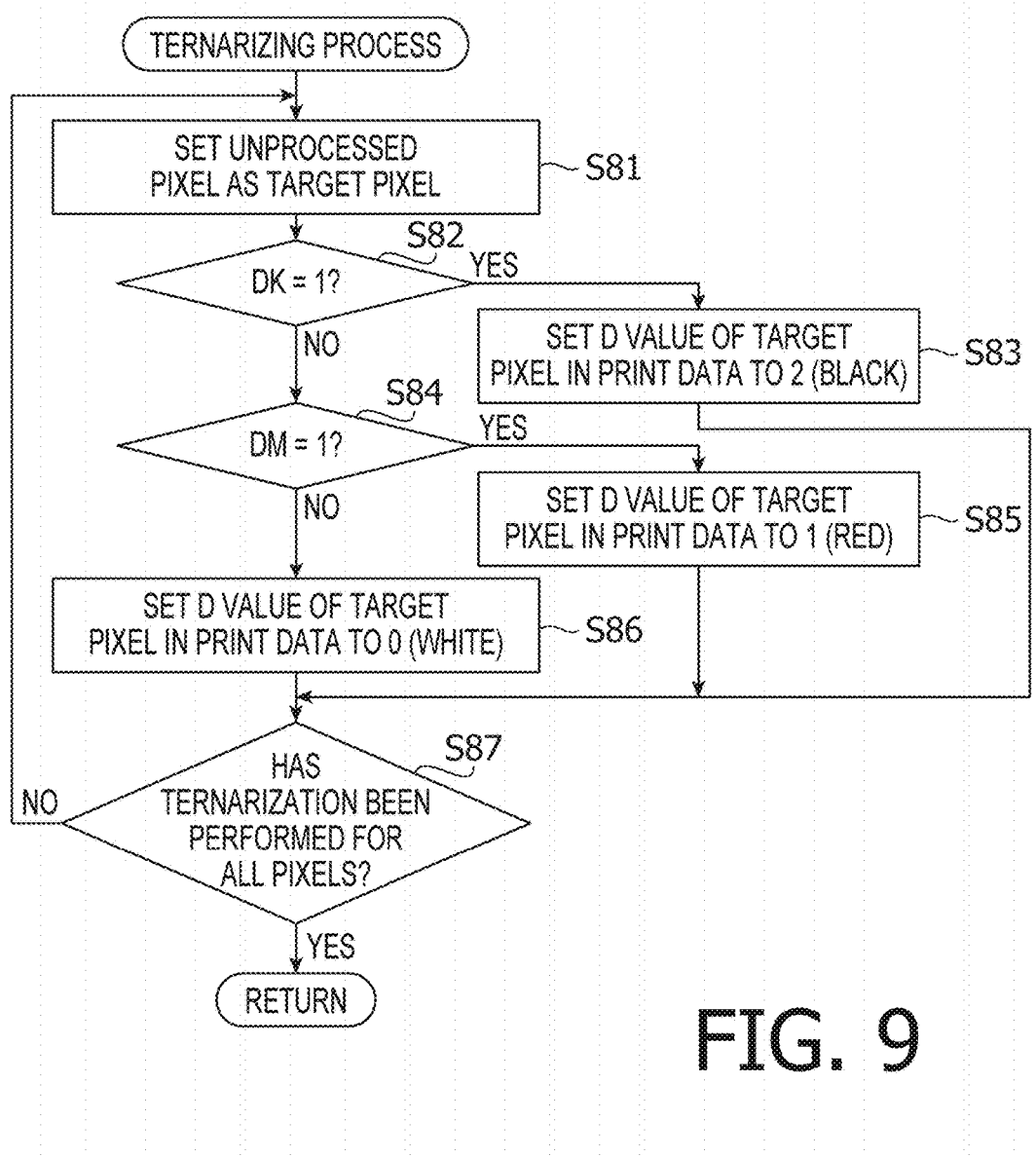

FIG. 9 is a flowchart showing a procedure of a ternarizing process in the illustrative embodiment according to one or more aspects of the present disclosure.

Figure 10:
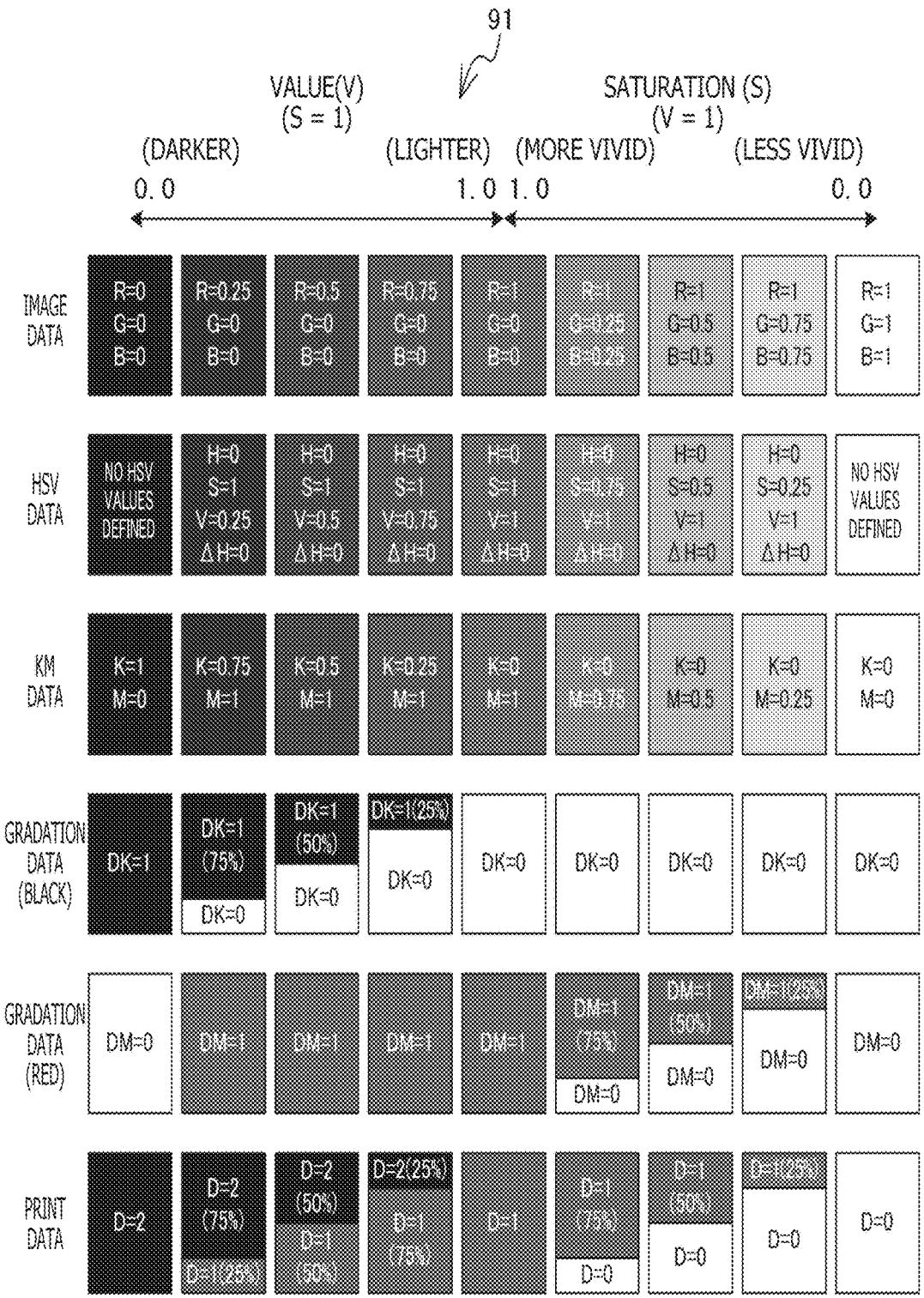

FIG. 10 exemplifies color samples for red converted from RGB image data into various types of data, in the illustrative embodiment according to one or more aspects of the present disclosure.

Figure 11:
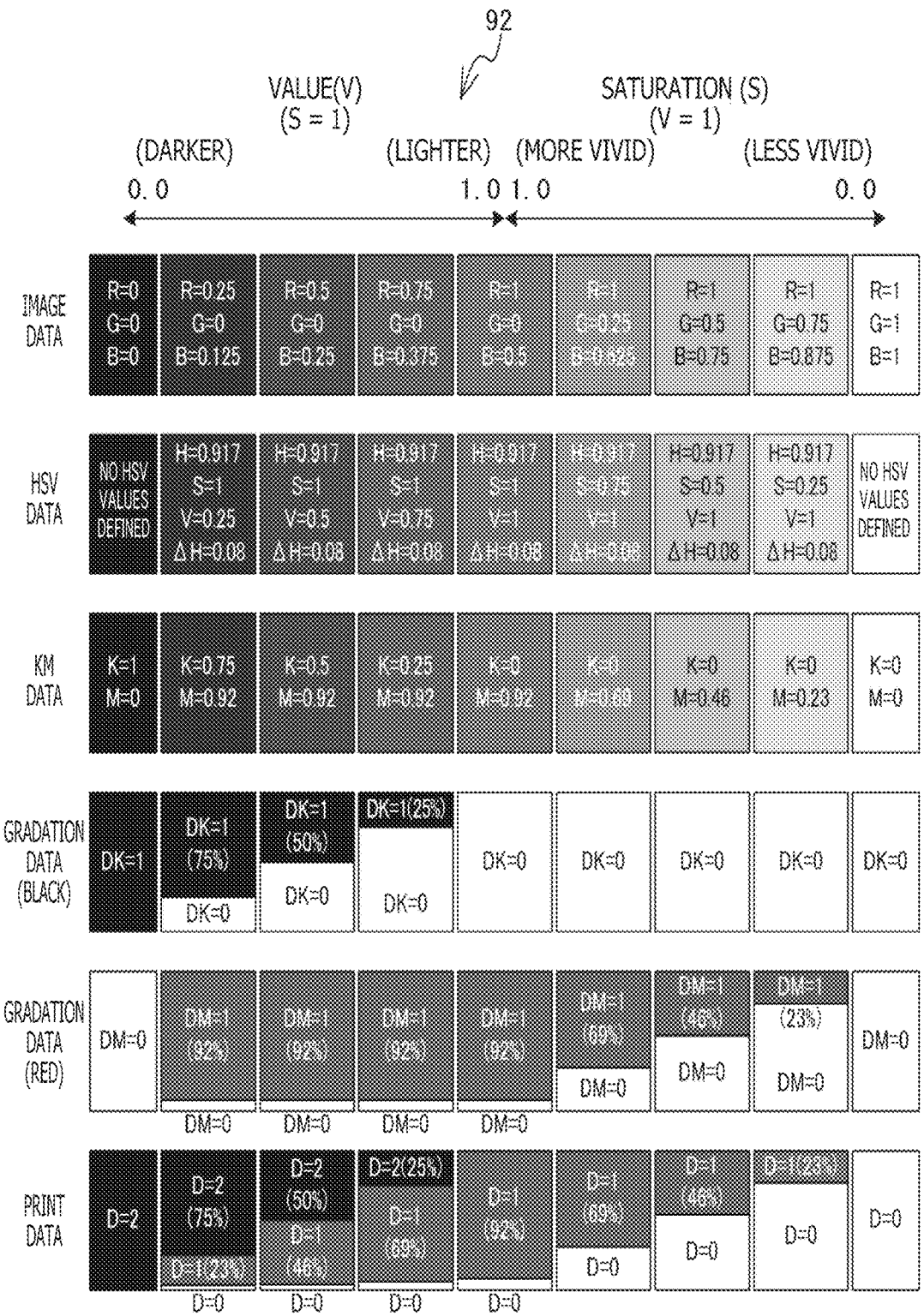

FIG. 11 exemplifies color samples for pink converted from RGB image data into various types of data, in the illustrative embodiment according to one or more aspects of the present disclosure.

Figure 12:
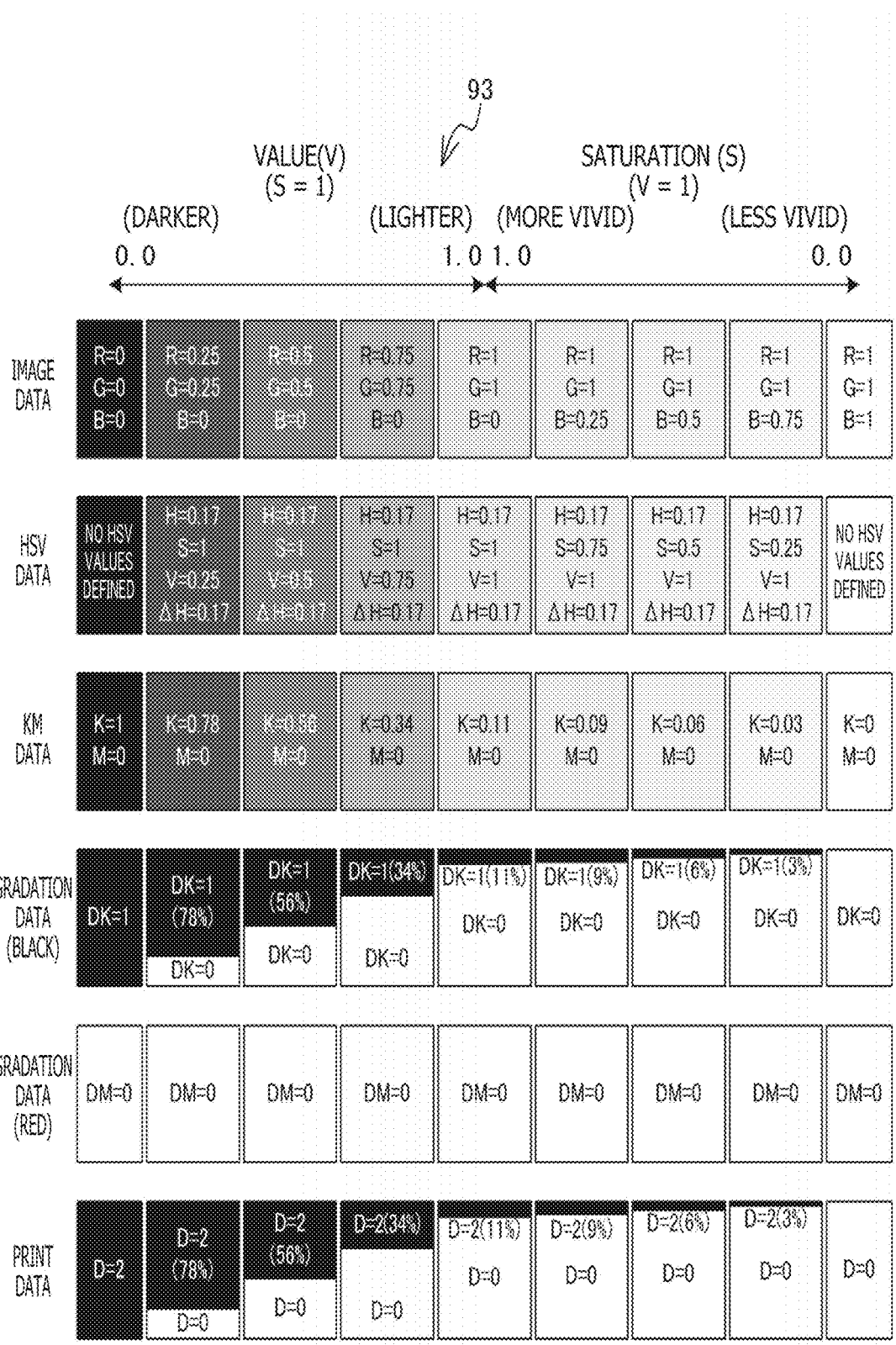

FIG. 12 exemplifies color samples for yellow converted from RGB image data into various types of data, in the illustrative embodiment according to one or more aspects of the present disclosure.

Figure 13:
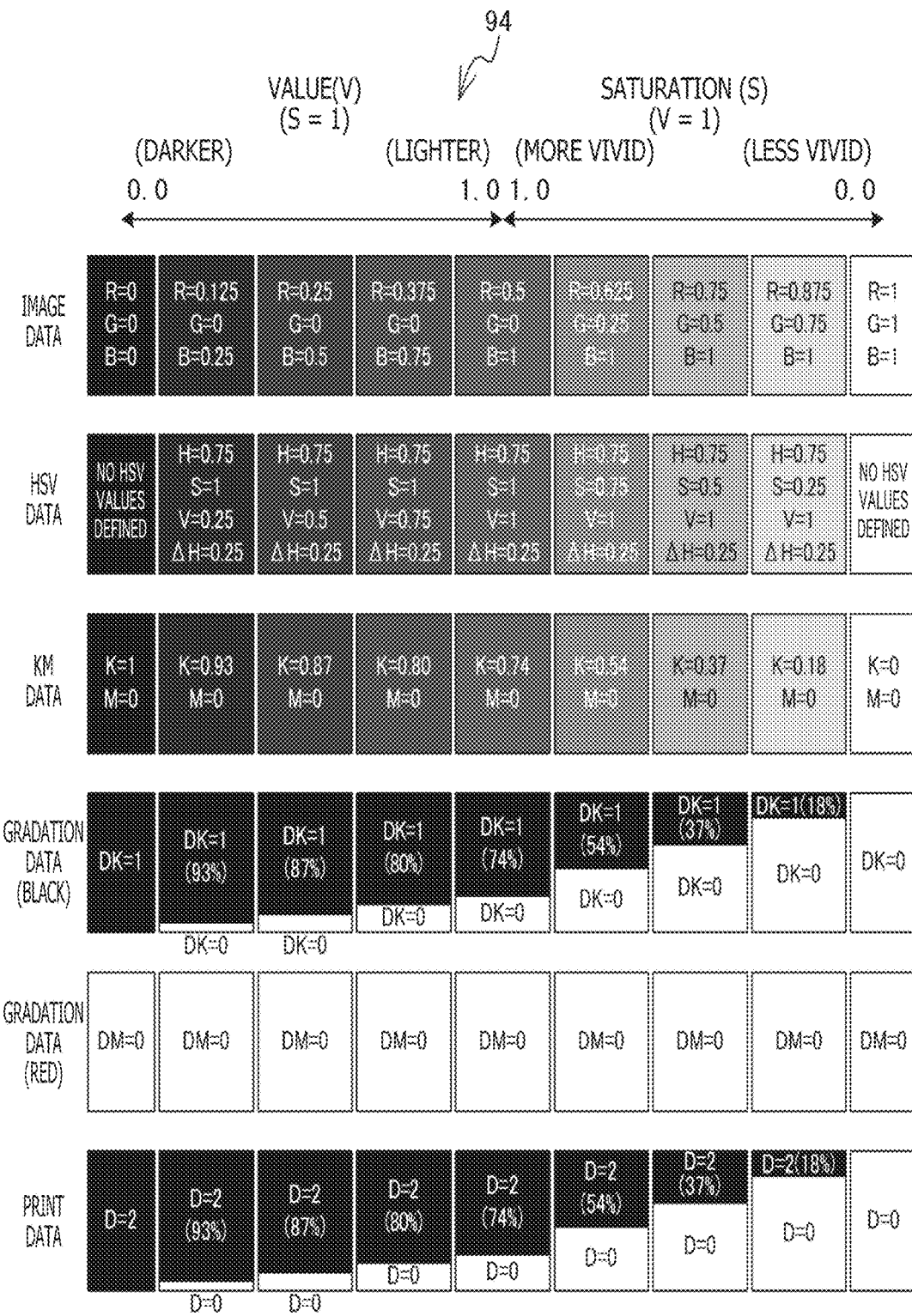

FIG. 13 exemplifies color samples for purple converted from RGB image data into various types of data, in the illustrative embodiment according to one or more aspects of the present disclosure.

Figure 14:
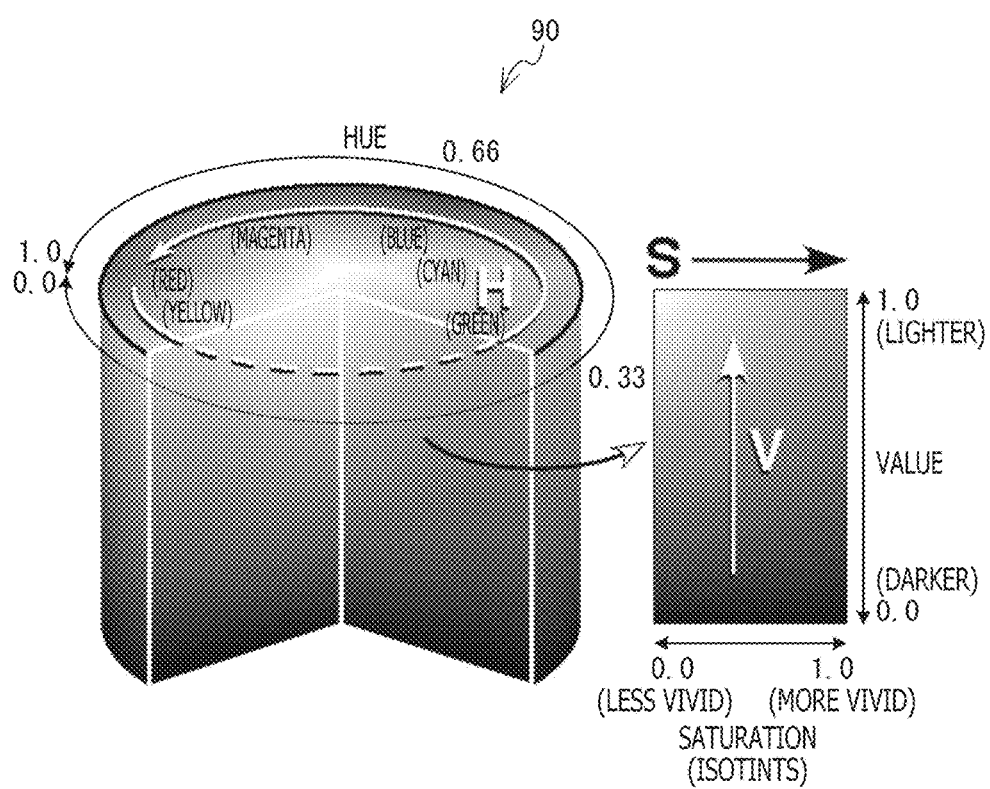

FIG. 14 is an illustration for setting forth an HSV color space model exemplified in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings. The drawings to be referred to in the following description are used to schematically show and set forth technical features according to aspects of the present disclosure. Nonetheless, the technical features shown in the drawings such as a configuration of an apparatus and flowcharts of various processes are just examples but are not limited to the ones exemplified in the drawings. In the following description, a lower right side, an upper left side, an upper right side, a lower left side, an upper side, and a lower side in FIG. 1 will be defined as a right side, a left side, a rear side, a front side, an upside and a downside of a printer 1, respectively. These directional definitions shall apply to descriptions referring to FIG. 2 and the subsequent drawings.

The following description presents an overview of the printer 1. The printer 1 is configured to connect with an external terminal via a USB cable ("USB" is an abbreviated form of "Universal Serial Bus"). For instance, the external terminal may be a general personal computer (hereinafter simply referred to as a "PC"), a mobile terminal, or a tablet terminal. In the illustrative embodiment, the printer 1 is connected with a PC 70 (see FIG. 3) as an example of the external terminal. A CPU 71 of the PC 70 executes a driver program 77B (see FIGS. 3 and 5) installed in the PC 70, thereby generating print data from image data. In order to express a plurality of pixels forming the image data with a plurality of dots on a print medium, the print data includes a plurality of pieces of dot data into which the image data is resolved to associate each piece of pixel data of the image data with a corresponding piece of dot data of the print data.

The printer 1 receives the print data from the PC 70 and generates print command data based on the print data. The print command data is for driving a plurality of heating elements 32 of a thermal head 31 (see FIG. 2) based on an energization pattern that associates each heating element 32 with a corresponding piece of dot data of the print data. The printer 1 is configured to control a quantity of energy to be provided onto the print medium by each individual heating element 32 and perform two-color printing to form red dots and black dots on the print medium. For instance, the print medium may be a long sheet 3A with a thermosensitive label attached onto a mount. In the illustrative embodiment, a printing sheet 3A with thermosensitive color developable layers 36 (see FIG. 4) laminated on a base material layer 37 is used as an example of the print medium. The printer 1 has a rolled sheet 3 as the long sheet 3A wound in a roll shape, within a housing 2. The printer 1 performs printing while pulling the sheet 3A out of the rolled sheet 3.

Figure 1:
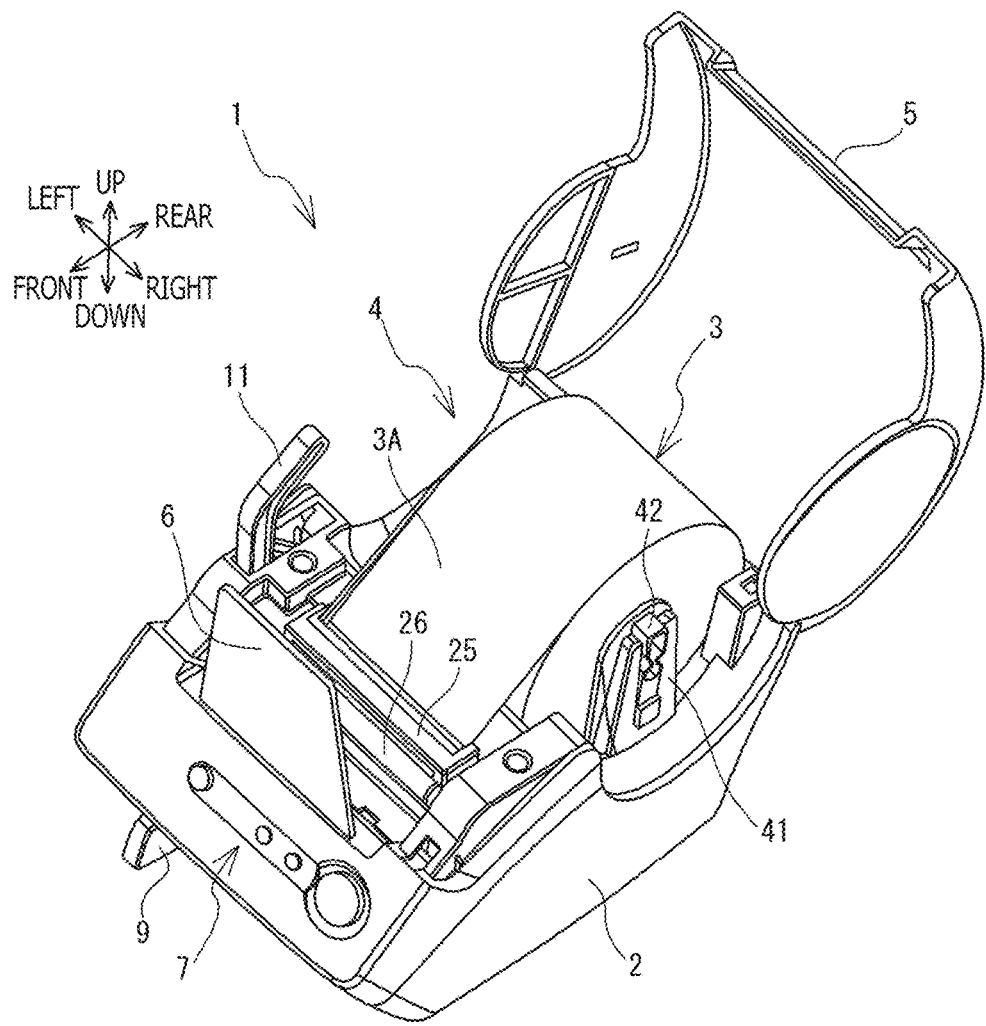
FIG. 1 is a perspective view showing a printer in a state where a cover is open, in an illustrative embodiment according to one or more aspects of the present disclosure.
Figure 2:
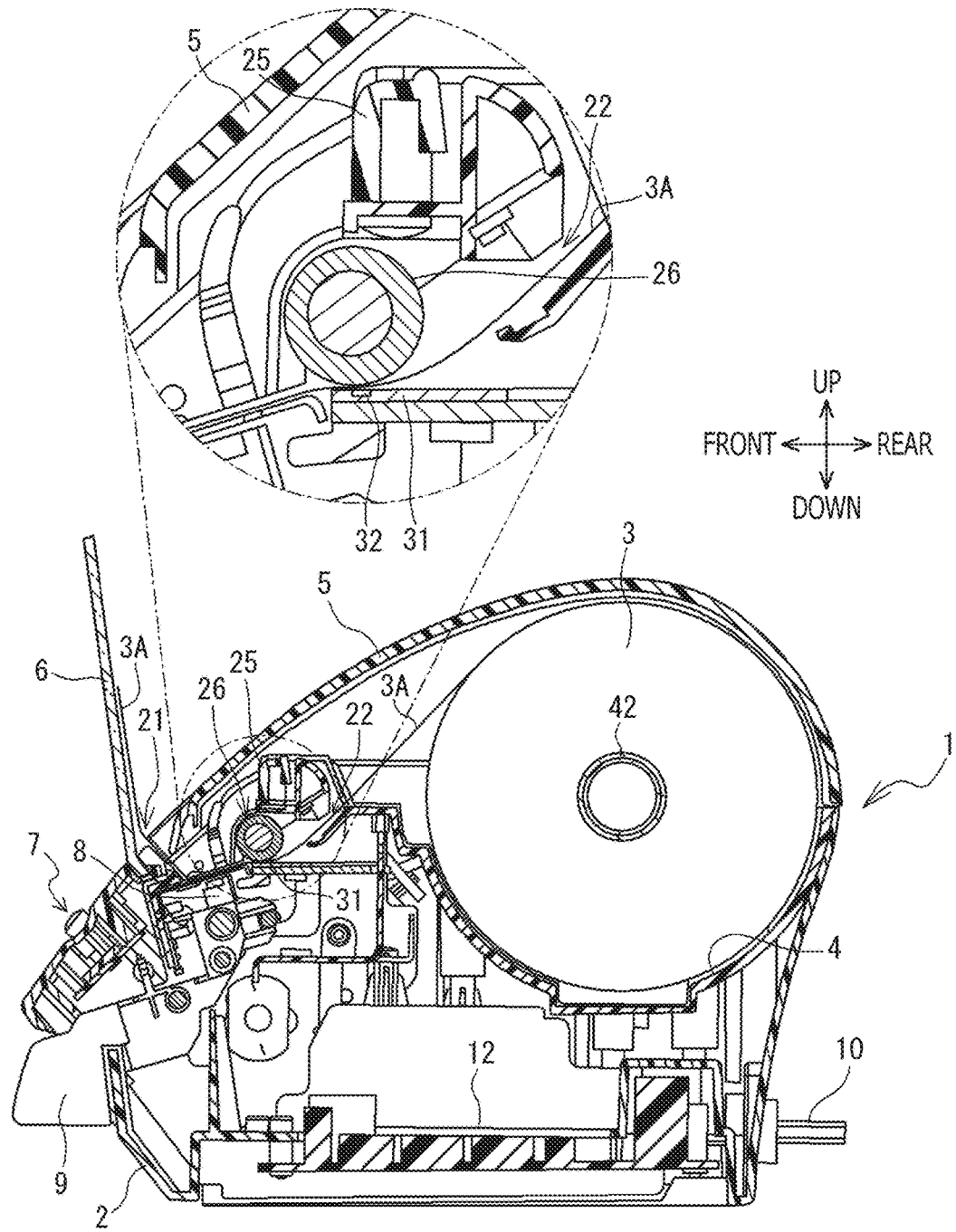
FIG. 2 is a cross-sectional side view showing the printer in a state where the cover is closed, in the illustrative embodiment according to one or more aspects of the present disclosure.

Referring to FIGS. 1 and 2, a configuration of the printer 1 will be described. As shown in FIG. 1, the printer 1 includes the housing 2 formed in a box shape with an open upper side. The housing 2 is formed in a rectangular shape in each of a front view and a plane view. The housing 2 is elongated in a front-to-rear direction. The open upper side of the housing 2 is covered with a cover 5. A rear part of each of left and right side portions of the housing 2 is open and covered with the cover 5. The cover 5 is rotatably supported by a rear end portion of the housing 2. The cover 5 is configured to swing around a rotation axis extending in a left-to-right direction in such a manner that a front end portion of the cover 5 moves up and down. When the cover 5 is closed, a rear part of an upper portion of the housing 2 is formed substantially in a round shape in a side view, and a front part of the upper portion of the housing 2 is inclined down in a forward direction.

The housing 2 has a cut lever 9 at a front surface thereof. The cut lever 9 is movable in the left-to-right direction. The cut lever 9 is connected with a cutter unit 8 (see FIG. 2). In response to movement of the cut lever 9 in the left-to-right direction, the cutter unit 8 moves in the left-to-right direction to cut the printed sheet 3A. At an upper surface of a front end portion of the housing 2, input keys 7 are disposed. The input keys 7 include a power switch. Behind the input keys 7 (i.e., at a rear side of the input keys 7), a plate-shaped tray 6 made of transparent resin is erected. Behind the tray 6, a discharge port 21 (see FIG. 2) is disposed. The discharge port 21 is elongated in the left-to-right direction. The discharge port 21 is formed by the front end portion of the cover 5 and the housing 2. The tray 6 is configured to receive the printed sheet 3A discharged via the discharge port 21. At a lower portion of a rear surface of the housing 2, a connector (not shown) is disposed that is connectable with a power cord 10 (see FIG. 2). Further, at the lower portion of the rear surface of the housing 2, a connector (not shown) is disposed that is connectable with a USB cable (not shown) for connecting the printer 1 with the PC 70.

As shown in FIG. 2, a sheet storage 4 is disposed at a rear portion inside the housing 2. The sheet storage 4 is formed to be recessed downward in an arc shape in a side view (when viewed in the left-to-right direction). An upper side, a left side, and a right side of the sheet storage 4 are open. The rolled sheet 3 (i.e., the sheet 3A wound in a roll shape) is set into the sheet storage 4. The rolled sheet 3 is wound with a printable surface as an inner side, and is held by a tape spool 42. The tape spool 42 engages with supporters 41 (see FIG. 1) erected at a left portion and a right portion of the sheet storage 4. Thus, the rolled sheet 3 is supported by the tape spool 42 to be rotatable in the sheet storage 4. When the cover 5 is open, the tape spool 42 is detachably attached to the supporters 41. A control board 12 is disposed below the sheet storage 4. The control board 12 has a CPU 51 (see FIG. 3) mounted thereon. The CPU 51 is configured to take overall control of the printer 1.

A lever 11 (see FIG. 1) is disposed at a front left side relative to the sheet storage 4. At a right side relative to the lever 11, a roller holder 25 is disposed. The roller holder 25 extends in the left-to-right direction. The roller holder 25 is configured to rotatably hold a platen roller 26. The lever 11 is always urged upward by a coil spring (not shown). When the cover 5 is closed, the lever 11 is pressed down by the cover 5. The lever 11 is connected with the roller holder 25. In conjunction with the lever 11 swinging up and down, the roller holder 25 moves up and down around a rear end thereof as a supporting point. In response to the lever 11 swinging down, the roller holder 25 moves downward. The platen roller 26 presses the sheet 3A pulled out of the rolled sheet 3, toward the thermal head 31. In this case, the printer 1 is brought into a printable state. In response to the cover 5 being opened, the lever 11 swings up, and thereby the roller holder 25 is moved upward. The platen roller 26 held by the roller holder 25 is separated from the thermal head 31 and the sheet 3A. In this case, the printer 1 is brought into an unprintable state.

The housing 2 includes a conveyance path 22. The conveyance path 22 is for conveying the sheet 3A pulled out of the rolled sheet 3, obliquely toward a lower front side from a front end of the sheet storage 4. The conveyance path 22 passes between the platen roller 26 and the thermal head 31, and extends up to the discharge port 21. In the illustrative embodiment, the printer 1 is configured to perform printing on the sheet 3A while conveying the sheet 3A from the sheet storage 4 to the discharge port 21. In the following description, a direction in which the sheet 3A is conveyed along and within the conveyance path 22 may be referred to as a "conveyance direction."

The platen roller 26 and the thermal head 31 are disposed substantially at a middle portion of the conveyance path 22. The thermal head 31 is configured to form a dot by heating the thermosensitive label to develop a color of dye contained in the thermosensitive label. The thermal head 31 is formed in a plate shape. The thermal head 31 includes a plurality of heating elements 32 in an upper surface thereof. The heating elements 32 are arranged in line along a main scanning direction (i.e., the left-to-right direction) perpendicular to the conveyance direction of the sheet 3A. For instance, in the illustrative embodiment, the thermal head 31 includes 360 heating elements 32 arranged in line along the main scanning direction. It is noted that in a position where the thermal head 31 is disposed, a direction perpendicular to the main scanning direction along which the heating elements 32 are arranged may be referred to as a "sub scanning direction." Near the heating elements 32, the sub scanning direction is coincident with the conveyance direction.

The platen roller 26 is rotatably supported by the roller holder 25. The platen roller 26 is disposed above the thermal head 31. The platen roller 26 is disposed in such a manner that an axial direction thereof is coincident with the main scanning direction parallel to the arrangement of the heating elements 32. Further, the platen roller 26 is opposed to the heating elements 32. The platen roller 26 is urged toward the thermal head 31 by the roller holder 25. The platen roller 26 is connected with a conveyance motor 61 (see FIG. 3) via one or more gears (not shown). The platen roller 26 is driven to rotate by the conveyance motor 61. The platen roller 26 and the thermal head 31 pinch the sheet 3A therebetween. When driven to rotate, the platen roller 26 conveys the sheet 3A.

The CPU 51 (see FIG. 3) of the printer 1 is configured to form on the sheet 3A a dot line of dots arranged in line according to the arrangement of the heating elements 32, by controlling a quantity of energy to be applied to each heating element 32. The dot line may be simply referred to as a "line." Each dot (i.e., each heated spot) develops a red color or a black color in accordance with the quantity of energy applied to a corresponding heating element 32 by the CPU 51. When forming a black dot, the CPU 51 applies a larger quantity of energy to a corresponding heating element 32 than when forming a red dot. Further, the CPU 51 controls a specific quantity of energy to be applied to each heating element 32 in synchronization with drive control of the platen roller 26. Thereby, a plurality of lines are formed on the sheet 3A to be arranged parallel to each other in a direction perpendicular to the arrangement direction of dots in a single line. The plurality of lines express shades of each color by existence (or non-existence) of individual dots formed on the sheet 3A, thereby forming a character and/or an image on the sheet 3A. In the following description, the arrangement direction of dots in a single line formed on the sheet 3A may be referred to as a "main scanning direction" for the sake of explanatory convenience. Further, the direction in which a plurality of lines are arranged parallel to each other on the sheet 3A may be referred to as a "sub scanning direction" for the sake of explanatory convenience.

Figure 3:
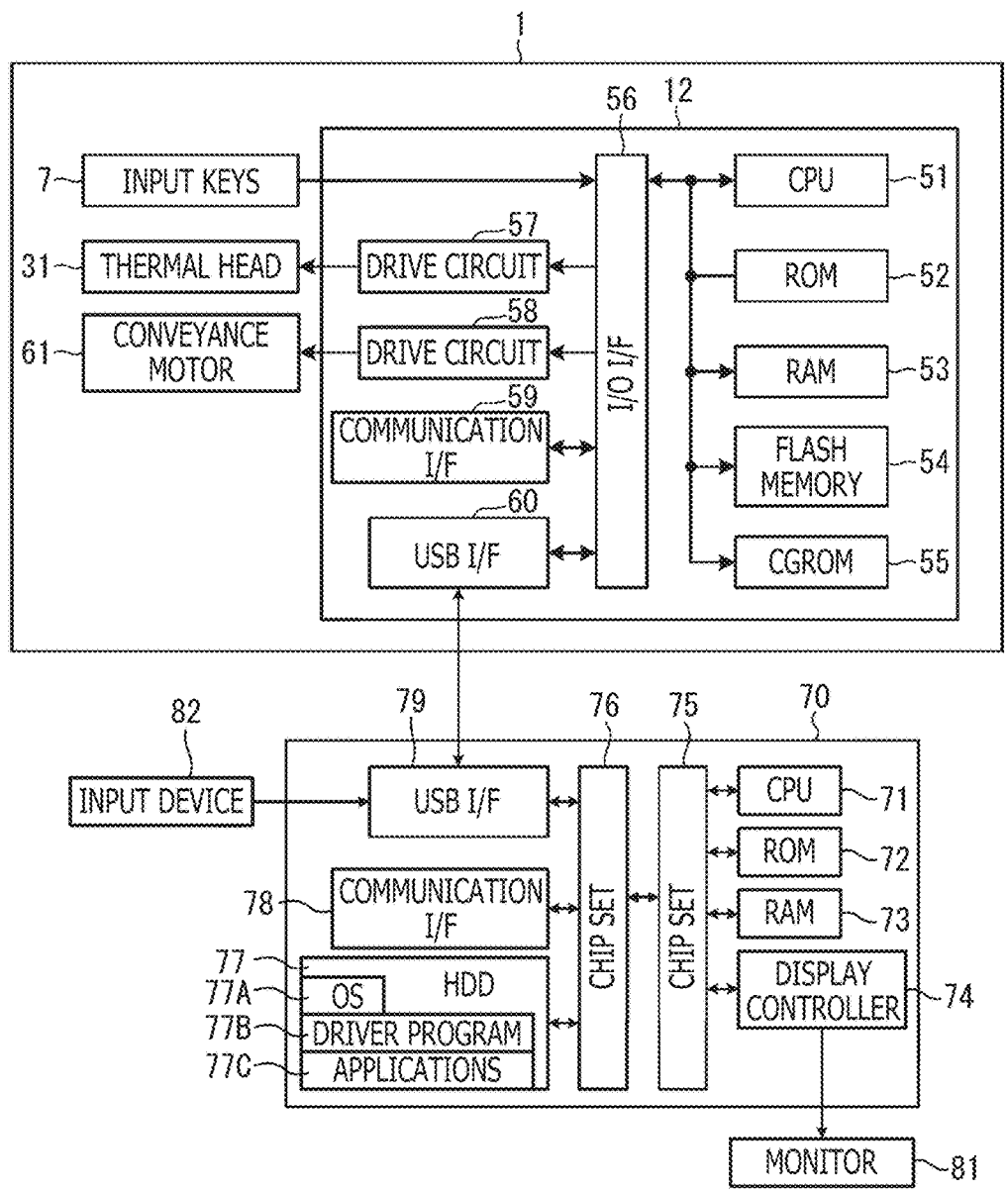
FIG. 3 is a block diagram showing electrical configurations of the printer and a personal computer (hereinafter referred to as a "PC") in the illustrative embodiment according to one or more aspects of the present disclosure.

Referring to FIG. 3, electrical configurations of the printer 1 and the PC 70 will be described. The printer 1 includes the CPU 51 configured to control the printer 1. The CPU 51 is connected with a ROM 52, a RAM 53, a flash memory 54, and a CGROM 55. The ROM 52 is configured to store programs executable by the CPU 51. The RAM 53 is configured to store various kinds of temporary data. The flash memory 54 is configured to store various kinds of data such as factory default setting values to be used when a print program is executed. The CGROM 55 is configured to store dot pattern data for printing various characters on the sheet 3A.

The CPU 51 is connected, via an input-output interface (hereinafter referred to as an "I/O I/F") 56, with the input keys 7, drive circuits 57 and 58, a communication interface (hereinafter referred to as a "communication I/F") 59, and a USB interface (hereinafter referred to as a "USB I/F") 60. The input keys 7 disposed at the upper surface of the printer 1 are configured to accept user operations. The drive circuit 57 is configured to apply a corresponding quantity of energy to each heating element 32 of the thermal head 31. The CPU 51 controls heat generation of each individual heating element 32 via the drive circuit 57. The drive circuit 58 is configured to drive the conveyance motor 61. The conveyance motor 61 may be a pulse motor. The CPU 51 controls the conveyance motor 61 via the drive circuit 58, thereby rotating the platen roller 26. Thus, the sheet 3A is conveyed on a line-by-line basis at a particular speed.

The communication I/F 59 is configured to perform communication with an external terminal via a network in a wired or wireless manner. The communication I/F 59 may be directly connected with the external terminal without involving any network. The USB I/F 60 is configured to communicate with an external terminal via a USB cable (not shown). In the illustrative embodiment, the printer 1 receives print data from the PC 70 via the USB cable.

The PC 70 includes the CPU 71 configured to control the PC 70. The CPU 71 is connected with a chip set 76. The CPU 71 is electrically connected with a ROM 72, a RAM 73, and a display controller 74 via the chip set 75. The chip set 75 is connected with a chip set 76. The CPU 71 is electrically connected with a hard disk drive (hereinafter referred to as an "HDD") 77, a communication I/F 78, and a USB I/F 79 via the chip sets 75 and 76.

The chip set 75 includes a group of circuits configured to manage data communication between the CPU 71 and the ROM 72, the RAM 72, and the display controller 74. The ROM 72 stores a boot program and a BIOS. The RAM 73 stores various kinds of temporary data. The display controller 74 is configured to control a monitor 81 to display thereon various kinds of information and images. The chip set 76 includes a group of circuits configured to manage data communication between the CPU 71 and the HDD 77, the communication I/F 78, and the USB I/F 79. The HDD 77 stores an OS 77A, the driver program 77B (see FIG. 5) for the printer 1, applications 77C, and various kinds of data. The communication I/F 78 is configured to perform communication with an external device via a network in a wired or wireless manner.

The below-mentioned driver program 77B may be compiled into a code corresponding to the PC 70 and stored in a computer-readable storage device connected with a file server. The computer-readable storage device may be a non-transitory storage medium that does not include a transitory medium such as a transmission signal. The driver program 77B may be transmitted as transmission signals from the file server to the PC 70 via an electric communication line such as a network. Alternatively, the driver program 77B may be stored in a non-transitory storage medium (not shown) such as a CD-ROM, a DVD-ROM, and a flash ROM. In this case, the CPU 71 of the PC 70 may read the driver program 77B out of the non-transitory storage medium with a reading device (not shown) connectable with the PC 70. The CPU 71 may store the driver program 77B into a computer-readable storage device of the PC 70. The HDD 77 is an example of the computer-readable storage device. Nonetheless, the computer-readable storage device is not limited to the HDD 77. For instance, examples of the computer-readable storage device include non-volatile storage devices (e.g., an SSD and a flash ROM) configured to hold data no matter how long the data is to be stored.

The USB I/F 79 is an interface for performing communication based on a USB standard. The CPU 71 is electrically connected with an input device 82 and the printer 1 via the USB I/F 79. The input device 82 is a device (e.g., a keyboard, a mouse, and a touch panel) configured to accept user operations for inputting information and instructions into the PC 70. The PC 70 is connected with the monitor 81 and the input device 82 as external devices. However, the PC 70 may have the monitor 81 and the input device 82 incorporated therein. In the above description, the electrical configuration of the PC 70 as a personal computer has been exemplified. Nonetheless, the PC 70 may be a smartphone or a tablet terminal. In such a case, an electrical configuration of the PC 70 as a smartphone or a tablet terminal may be assumed as being substantially equivalent to the electrical configuration of the PC 70 exemplified as above, for the sake of explanatory convenience.

Referring to FIG. 4, the sheet 3A in the illustrative embodiment will be described. As described above, the sheet 3A is a print medium configured to develop one of the two colors (e.g., red and black) on a dot-by-dot basis depending on the quantity of energy provided onto the print medium by each individual heating element 32 of the thermal head 31. The sheet 3A is pulled out of the rolled sheet 3 as the long sheet 3A wound in a roll shape, and is fed onto the conveyance path. The sheet 3A is pinched between the thermal head 31 and the platen roller 26. In the following description, a surface of the sheet 3A that faces the thermal head 31 in a printing operation may be referred to as a first surface or a first side. A surface of the sheet 3A opposite to the first surface may be referred to as a second surface or a second side. In FIG. 4, the first surface of the sheet 3A faces upward.

The sheet 3A includes a protective layer 35, the thermosensitive color developable layers 36, the base material layer 37, and a release paper 38 in descending order from the first surface. The protective layer 35 is a transparent layer configured to protect a first-side surface (i.e., an upper surface in FIG. 4) of the thermosensitive color developable layers 36. Each of the thermosensitive color developable layers 36 is configured to develop a corresponding color when heated to a particular temperature for a particular period of time by each heating element 32 of the thermal head 31. The thermosensitive color developable layers 36 include two layers configured to develop mutually-different colors when heated. For instance, in the illustrative embodiment, the thermosensitive color developable layers 36 have a red color developable layer 36M and a black color developable layer 36K in descending order from the first surface. The red color developable layer 36M contains a developer and a leuco dye that generates a red pigment when reacting with the developer. The black color developable layer 36K contains a developer and a leuco dye that generates a black pigment when reacting with the developer. Each of the red color developable layer 36M and the black color developable layer 36K is transparent before developing the corresponding color. The CPU 51 of the printer 1 is enabled to cause the thermosensitive color developable layers 36 to develop an intended one of the two colors by controlling conditions for providing energy to the thermosensitive color developable layers 36. The black color developable layer 36K develops the black color when heated at a temperature higher than a heating temperature that causes the red color developable layer 36M to develop the red color.

The base material layer 37 is a foundation supporting the other layers of the sheet 3A. For instance, a color of the base material layer 37 is white. As described above, the thermosensitive color developable layers 36 are transparent before developing the respective colors. Hence, when none of the thermosensitive color developable layers 36 develops the corresponding color, the color of the sheet 3A is white as the color of the base material layer 37. A second-side surface (i.e., a lower surface in FIG. 4) of the base material layer 37 is coated with adhesive. The release paper 38 is detachably attached onto the second-side surface of the base material layer 37. The release paper 38 protects the adhesive. When the release paper 38 is detached from the sheet 3A after completion of the printing operation, the user is allowed to attach the sheet 3A onto a desired location via the adhesive.

As described above, in the illustrative embodiment, the CPU 51 of the printer 1 is configured to cause the sheet 3A to develop an intended one of the two colors (e.g., red and black) by controlling the conditions for providing energy onto the thermosensitive color developable layers 36. The color of a portion of the sheet 3A that has not developed any one of the two colors is white as the color of the base material layer 37. According to the print data received from the PC 70, the CPU 51 generates print command data that associates a command based on an energization pattern for energizing each heating element 32 of the thermal head 31 with a corresponding piece of dot data of the print data. The CPU 51 performs printing on the sheet 3A by performing a process of forming a plurality of dots in a single line by the heating elements 32 arranged in line along the main scanning direction repeatedly over a plurality of lines arranged in parallel in the sub scanning direction.

The print data includes a plurality of pieces of two-dimensional dot data each of which is represented by coordinates (X, Y) and a value (0, 1, 2). A value of the X-axis identifies a specific one of the dots to be formed corresponding to the heating elements 32 arranged in line along the main scanning direction. A value of the Y-axis identifies a specific one of the lines to be formed arranged in parallel in the sub scanning direction. Suppose for instance that in the print data, a value of a specific piece of dot data identified by the value of the X-axis in printing of a specific line identified by the value of the Y-axis is equal to 1 or 2. In such a case, the CPU 51 energizes a specific heating element 32 corresponding to the value of the X-axis, thereby forming a dot. When the value of the specific piece of dot data is 1, the CPU 51 applies to the specific heating element 32 a quantity of energy corresponding to the red color. In this case, the dot (i.e., the heated spot) develops the red color. Meanwhile, when the value of the specific piece of dot data is 2, the CPU 51 applies to the specific heating element 32 a quantity of energy corresponding to the black color. In this case, the dot (i.e., the heated spot) develops the black color. Further, when the value of the specific piece of dot data is 0, the CPU 51 does not energize the specific heating element 32. In this case, a dot is not formed (i.e., a white dot is formed). It is noted that according to aspects of the present disclosure, color development is not limited to developing a specific color by a reaction between a developer and a leuco dye but may include achromatizing a heated spot by a reaction between a developer and an achromatizing agent. Further, printing by the printer 1 is not limited to printing on thermosensitive media but may include heat transfer printing.

Subsequently, the driver program 77B to be executed by the CPU 71 of the PC 70 will be described. The driver program 77B is configured to generate print data to be transmitted to the printer 1 when an application 77C executes print processing to cause the printer 1 to perform printing. In the illustrative embodiment, the print data is subtractive color data with the number of colors reduced to two (e.g., black as a reference color and red as an emphasis color) from full-color image data. The reference color is used to represent colors other than the emphasis color by a luminance value (i.e., a degree of brightness). The emphasis color is a particular chromatic color represented by a hue value and a saturation value.

The CPU 71 of the PC 70 executes the driver program 77B in response to accepting, in an application 77C, an instruction to output print data to the printer 1. As shown in FIG. 5, the CPU 71 performs a main process of the driver program 77B, and configures initial settings (S1). Specifically, the CPU 71 secures, in the RAM 73, a storage area for storing various kinds of data and parameters. Then, the CPU 71 reads out initial values of various parameters from the HDD 77 and stores the initial values in the storage area of the RAM 73.

The various parameters include an Hr value, a threshold T1, a threshold T2, and ΔH. The Hr value is a below-mentioned hue value of a color used as an emphasis color by the printer 1. The Hr value is set appropriately for an emphasis color printable by the printer 1. For the printer 1 of the illustrative embodiment, the emphasis color is red. An initial value "0" of the Hr value is set in the HDD 77. The threshold T1 is a threshold for setting a specific hue range within which the printer 1 performs printing using the emphasis color. The threshold T1 may be changed by the user. An initial value (e.g., 0.1) of the threshold T1 is set in the HDD 77.

The threshold T2 is a threshold of a density value for representing each of the respective densities of the reference color and the emphasis color of each pixel in a two-level gradation (halftoning) method in a gradation process. The threshold value T2 is set in a known dither method. In the illustrative embodiment, the CPU 71 sets the threshold value T2 using a Bayer-type dither matrix for the sake of high-speed processing. The Bayer-type dither matrix is a mask in which natural numbers of 1 to $n^2$ each multiplied by $1/n^2$ are arranged in an n×n matrix at random or in a predetermined order. In the gradation process, the CPU 71 separates all pixels of KM data into blocks on the basis of n×n pixels per block, and allocates the dither matrix to each block. Further, in the gradation process, the CPU 71 sets as the threshold T2 a value of the dither matrix that corresponds to a target pixel to be processed. ΔH is a difference value between a hue value of the target pixel and a hue value of a color used as the emphasis color. ΔH is compared with the threshold T1 to set the specific hue range within which the printer 1 performs printing using the emphasis color.

The storage area for storing various kinds of data includes a plurality of storage areas such as a storage area for image data, a storage area for HSV data, a storage area for KM data, a storage area for synthetic data, a storage area for gradation data, and a storage area for print data. The storage area for image data is configured to store image data representing a print target image with a plurality of pixels of which the count corresponds to a resolution. Each pixel has RGB data (R value, G value, B value) representing a color of each corresponding pixel, and a below-mentioned marker flag. The RGB data of each pixel represents the color of each pixel by additive color mixing of the three primary colors, i.e., red (R), green (G), and blue (B). Namely, the RGB data of each pixel represents respective density values of RGB for each pixel. Each value of the R value, the G value, and the B value in the RGB data of each pixel is within a range from 0 to 1.

The storage area for HSV data is configured to store below-mentioned HSV data (H value, S value, V value) into which the RGB data of each pixel of the image data is converted. The storage area for KM data is configured to store KM data calculated for each pixel based on the RGB data or the HSV data. The KM data (K value. M value) of each pixel represents respective density values of the reference color and the emphasis color. Each of the K value and the M value in the KM data of each pixel is within a range from 0 to 1. The storage area for synthetic data is configured to store RGB data (R value, G value, B value) calculated for each pixel based on the KM data.

The storage area for gradation data is configured to store gradation data determined for each pixel based on the KM data. The gradation data (DK value, DM value) of each pixel represents whether there exists a corresponding dot to be formed with the reference color and whether there exists a corresponding dot to be formed with the emphasis color. Each of the DK value and the DM value in the gradation data is equal to 0 or 1. The value "0" represents non-existence of a dot to be formed. The value "1" represents existence of a dot to be formed. When DK=1, the reference color is set as a candidate for the color of a corresponding pixel in the print data. When DM=1, the emphasis color is set as a candidate for the color of a corresponding pixel in the print data. The storage area for print data is configured to store print data determined for each pixel based on the gradation data. The print data (D value) of each pixel represents whether there exists a corresponding dot to be formed with the reference color or the emphasis color. The D value is equal to 0, 1, or 2. The D value equal to 0 represents non-existence of a dot to be formed. The D value equal to 1 represents existence of a dot to be formed with the emphasis color. The D value equal to 2 represents existence of a dot to be formed with the reference color.

The CPU 71 reads original data output from an application 77C (S2). The original data is data transferred from the application 77C to the driver program 77B. The original data includes various kinds of data such as character codes, raster data, vector data, and control commands. Based on the original data, the CPU 71 generates image data in accordance with a resolution for printing in the storage area secured in the RAM 73 (S3). When the original data includes a character code, the CPU 71 generates an image of a character corresponding to the character code in a size according to the resolution, and allocates the generated image on the image data. When the original data includes vector data, the CPU 71 allocates on the image data an image drawn in a size according to the resolution based on the vector data. When the original data includes raster data, the CPU 71 allocates an image represented by the raster data, on the image data in a size according to the resolution.

FIGS. 10 to 13 show color samples 91 to 94, respectively. The color samples 91 show 9 color samples for red that are expressed under mutually different display conditions, on horizontally-arranged 9 tiles, respectively. The color samples 92 show 9 color samples for pink that are expressed under mutually different display conditions, on horizontally-arranged 9 tiles, respectively. The color samples 93 show 9 color samples for yellow that are expressed under mutually different display conditions, on horizontally-arranged 9 tiles, respectively. The color samples 94 show 9 color samples for purple that are expressed under mutually different display conditions, on horizontally-arranged 9 tiles, respectively. Each tile includes a plurality of dots arranged in a tile shape. All of the dots included in each individual tile have an identical color in full color. Each series of the color samples 91 to 94 show 9 specific color samples (respectively shown on the horizontally-arranged 9 tiles) each of which is expressed in various types of data formats (e.g., the image data, the HSV data, the KM data, the gradation data, and the print data) that are vertically arranged.

As shown in FIG. 10, in the RGB data of the color samples 91 (red), the first to fifth tiles from the left have the same G value equal to 0, the same B value equal to 0, and respective R values that increase rightward from 0 to 1 by an increment of 0.25. The leftmost tile has an R value, a G value, and a B value that are all equal to 0. Namely, the leftmost tile represents black color. In the RGB data of the color samples 91, the first to fifth tiles from the right have the same R value equal to 1. Further, each of the first to fifth tiles from the right has a G value and a B value that are identical to each other. More specifically, the first to fifth tiles from the right have respective G values and respective B values that increase rightward from 0 to 1 by an increment of 0.25. The rightmost tile has an R value, a G value, and a B value that are all equal to 1. Namely, the rightmost tile represents white color.

As shown in FIG. 11, in the RGB data of the color samples 92 (pink), the first to fifth tiles from the left have the same G value equal to 0. Further, the first to fifth tiles from the left have respective R values that increase rightward from 0 to 1 by an increment of 0.25. Further, the first to fifth tiles from the left have respective B values that increase rightward from 0 to 0.5 by an increment of 0.125. The leftmost tile represents black color. In the RGB data of the color samples 92, the first to fifth tiles from the right have the same R value equal to 1. Further, the first to fifth tiles from the right have respective G values that increase rightward from 0 to 1 by an increment of 0.25. Further, the first to fifth tiles from the right have respective B values that increase rightward from 0.5 to 1 by an increment of 0.125. The rightmost tile represents white color.

As shown in FIG. 12, in the RGB data of the color samples 93 (yellow), the first to fifth tiles from the left have the same B value equal to 0. Further, each of the first to fifth tiles from the left has an R value and a G value that are identical to each other. More specifically, the first to fifth tiles from the left have respective R values and respective G values that increase rightward from 0 to 1 by an increment of 0.25. The leftmost tile represents black color. In the RGB data of the color samples 93, the first to fifth tiles from the right have the same R value equal to 1, the same G value equal to 1, and respective B values that increase rightward from 0 to 1 by an increment of 0.25. The rightmost tile represents white color.

As shown in FIG. 13, in the RGB data of the color samples 94 (purple), the first to fifth tiles from the left have the same G value equal to 0. Further, the first to fifth tiles from the left have respective R values that increase rightward from 0 to 0.5 by an increment of 0.125. Further, the first to fifth tiles from the left have respective B values that increase rightward from 0 to 1 by an increment of 0.25. The leftmost tile represents black color. In the RGB data of the color samples 94, the first to fifth tiles from the right have the same B value equal to 1. Further, the first to fifth tiles from the right have respective R values that increase rightward from 0.5 to 1 by an increment of 0.125. Further, the first to fifth tiles from the right have respective G values that increase rightward from 0 to 1 by an increment of 0.25. The rightmost tile represents white color.

As shown in FIG. 5, the CPU 71 refers to the RAM 73 and determines whether a lip modification setting is ON (S4). When determining that the lip modification setting is OFF (S4: No), the CPU 71 goes to S8. When determining that the lip modification setting is ON (S4: Yes), the CPU 71 performs a face detecting process (S5). Although a detailed explanation of the face detecting process will be omitted as it is known processing, when there is a face image within an image represented by the image data, the CPU 71 further performs detection of a lip part within the face image (S6). When there is not a face image within the image represented by the image data, or when a lip part is not detected within the face image (S6: No), the CPU 71 goes to S8. When a lip part is detected within the face image (S6: Yes), the CPU 71 sets ON the marker flag of each pixel representing the lip part among the pixels forming the image data in order to print the lip part with the reference color (S7).

The CPU 71 performs a subtractive color process for the image data (S8). As shown in FIG. 6, in the subtractive color process, the CPU 71 sets, as a target pixel to be processed, a pixel (i.e., an unprocessed pixel) for which subtractive color processing has not been performed among the pixels forming the image data (S21). The CPU 71 performs an HSV conversion process for the target pixels (S22).

The HSV conversion process is processing to convert a color of each pixel represented by RGB data into HSV data represented by hue (H), saturation (S), and value (V) based on a known arithmetic expression. The color of each pixel may be represented in an HSV color space formed by the three components, i.e., hue (H), saturation (S), and value (V). An HSV model 90 shown in FIG. 14 is the HSV color space visualized as a cylindrical body (i.e., the HSV model 90 is the HSV color space represented by cylindrical coordinates).

The hue (H) represents a type of color. In the HSV model 90, the hue is defined as an angular value that is variable within a range from 0 to 360 along an outer circumference of the cylindrical body. In the illustrative embodiment, an H value (i.e., a hue value) is a normalized value within a range from 0 to 1. Colors indefinable by the hue are achromatic colors, i.e., white, black, and mixed colors (gray) of white and black.

The saturation (S) represents a degree of vividness or chromatic purity of a color. In the HSV model 90, the saturation is expressed as a distance from a center of the cylindrical body in a radial direction. The saturation is defined as a numerical value that is variable within a range from 0 to 1. When a color is expressed as a mixture of a chromatic color, white, and black, the saturation is represented by a mixture ratio of the chromatic color in the whole. As an S value (i.e., a saturation value) is larger, the color is more vivid. As the S value is smaller, the color is less vivid.

The value (V) represents a degree of lightness (brightness) of a color. In the HSV model 90, the value is expressed as a distance in a vertical direction toward a top from a bottom of the cylindrical body. The value (V) is defined as a numerical value that is variable within a range from 0 to 1. When a color is expressed as a mixture of a chromatic color, white, and black, the value (V) is represented by a mixture ratio of white to black. As a V value (i.e., a lightness value) is larger, the color is lighter. As the V value is smaller, the color is darker.

It has been known that the method in which the HSV model 90 represents a color is similar to a method in which a human senses the color. Accordingly, a color represented using the HSV color space is reproduced to be closer to a color sensed by a human than a color represented using the RGB color space. The driver program generates the emphasis color via the HSV conversion process in the process of generating the print data from the image data.

As shown in FIG. 7, in the HSV conversion process, the CPU 71 reads the RGB data of the target pixel into the RAM 73, and obtains respective density values (R value, G value, B value) of RGB. The CPU 71 determines a maximum value (MAX) and a minimum value (MIN) of the R value, the G value, and the B value, and stores the maximum value and the minimum value into the RAM 73 (S41). The CPU 71 compares the maximum value and the minimum value with each other (S42). When determining that the maximum value is equal to the minimum value (MAX=MIN) (S42: Yes), the CPU 71 determines that the color of the target pixel is an achromatic color. The CPU 71 stores a code representing "no hue defined" into the storage area for HSV data (S43). Then, the CPU 71 goes to S23 in the subtractive color process (see FIG. 6).

When determining that the maximum value is not equal to the minimum value (S42: No), the CPU 71 determines that the color of the target pixel is a chromatic color. The CPU 71 determines which value is the minimum value among the R value, the G value, and the B value (S44 and S46). When determining that the B value is the minimum value (MIN=B) (S44: Yes), the CPU 71 calculates an H value based on the following expression (1) (S45). The CPU 71 stores the calculated H value into the storage area for HSV data, and then goes to S49.

$$H = \left(\frac{G-R}{MAX-MIN} + 1\right) \times \frac{1}{6} \quad (1)$$

When determining that the R value is the minimum value (MIN=R) (S44: No, and S46: Yes), the CPU 71 calculates an H value based on the following expression (2) (S47). The CPU 71 stores the calculated H value into the storage area for HSV data, and then goes to S49.

$$H = \left(\frac{B-G}{MAX-MIN} + 3\right) \times \frac{1}{6} \quad (2)$$

When determining that the G value is the minimum value (MIN=G) (S44: No, and S46: No), the CPU 71 calculates an H value based on the following expression (3) (S48). The CPU 71 stores the calculated H value into the storage area for HSV data, and then goes to S49.

$$H = \left(\frac{R-B}{MAX-MIN} + 5\right) \times \frac{1}{6} \quad (3)$$

The CPU 71 calculates a V value based on the following expression (4) (S49). The CPU 71 stores the calculated V value into the storage area for HSV data, and then goes to S50.

$$V = MAX \quad (4)$$

The CPU 71 calculates an S value based on the following expression (5) (S50). The CPU 71 stores the calculated S value into the storage area for HSV data, and then goes to S23 in the subtractive color process (see FIG. 6).

$$S = \frac{MAX - MIN}{MAX} \quad (5)$$

As shown in FIG. 10, in the HSV data of the color samples 91 (red), the second to fifth tiles from the left have the same H value equal to 0, the same S value equal to 1, and respective V values that increase rightward from 0.25 to 1 by an increment of 0.25. The leftmost tile represents black color with no hue defined. In the HSV data of the color samples 91, the second to fifth tiles from the right have the same H value equal to 0, the same V value equal to 1, and respective S values that decrease rightward from 1 to 0.25 by an increment of 0.25. The rightmost tile represents white color with no hue defined.

As shown in FIG. 11, in the HSV data of the color samples 92 (pink), the second to fifth tiles from the left have the same H value equal to 0.917, the same S value equal to 1, and respective V values that increase rightward from 0.25 to 1 by an increment of 0.25. The leftmost tile represents black color with no hue defined. In the HSV data of the color samples 92, the second to fifth tiles from the right have the same H value equal to 0.917, the same V value equal to 1, and respective S values that decrease rightward from 1 to 0.25 by an increment of 0.25. The rightmost tile represents white color with no hue defined.

As shown in FIG. 12, in the HSV data of the color samples 93 (yellow), the second to fifth tiles from the left have the same H value equal to 0.17, the same S value equal to 1, and respective V values that increase rightward from 0.25 to 1 by an increment of 0.25. The leftmost tile represents black color with no hue defined. In the HSV data of the color samples 93, the second to fifth tiles from the right have the same H value equal to 0.17, the same V value equal to 1, and respective S values that decrease rightward from 1 to 0.25 by an increment of 0.25. The rightmost tile represents white color with no hue defined.

As shown in FIG. 13, in the HSV data of the color samples 94 (purple), the second to fifth tiles from the left have the same H value equal to 0.75, the same S value equal to 1, and respective V values that increase rightward from 0.25 to 1 by an increment of 0.25. The leftmost tile represents black color with no hue defined. In the HSV data of the color samples 94, the second to fifth tiles from the right have the same H value equal to 0.75, the same V value equal to 1, and respective S values that decrease rightward from 1 to 0.25 by an increment of 0.25. The rightmost tile represents white color with no hue defined.

As shown in FIG. 6, the CPU 71 determines whether there is a hue defined in the HSV data of the target pixel (S23). When the color of the target pixel is an achromatic color, the CPU 71 determines that there is no hue defined in the HSV data of the target pixel (S23: No). In this case, the CPU 71 goes to the below-mentioned step S33 to print the target pixel only with the reference color.

When the color of the target pixel is a chromatic color, the HSV data of the target pixel has a hue defined for the target pixel. Namely, in this case, an H value, an S value and a V value are stored in the HSV data of the target pixel. When determining that there is a hue defined in the HSV data of the target pixel (S23: Yes), the CPU 71 determines whether an Hr value is equal to or less than 0.5 (S24). When determining that the Hr value is equal to or less than 0.5 (S24: Yes), the CPU 71 determines whether the H value is more than a value (Hr+0.5) obtained by adding 0.5 to the Hr value (S25). When determining that the H value is more than the value (Hr+0.5) (S25: Yes), the CPU 71 subtracts 1 from the H value (S26), and thereafter goes to S29. Meanwhile, when determining that the H value is equal to or less than the value (Hr+0.5) (S25: No), the CPU 71 directly goes to S29.

Further, when determining that the Hr value is more than 0.5 (S24: No), the CPU 71 determines whether the H value is equal to or less than a value (Hr−0.5) obtained by subtracting 0.5 from the Hr value (S27). When determining that the H value is equal to or less than the value (Hr−0.5) (S27: Yes), the CPU 71 adds 1 to the H value (S28), and thereafter goes to S29. Meanwhile, when determining that the H value is more than the value (Hr−0.5) (S27: No), the CPU 71 directly goes to S29.

The CPU 71 calculates ΔH based on the following expression (6) (S29).

$$\Delta H = |H - Hr| \quad (6)$$

Namely, ΔH is a difference value between the hue value (i.e., the H value) of the target pixel and the hue value (i.e., the Hr value) of the color used as the emphasis color. As ΔH is smaller, the hue of the target pixel is closer to the hue of the emphasis color.

The CPU 71 determines whether the marker flag of the target pixel is set ON (S30). When the marker flag of the target pixel is set ON (S30: Yes), the CPU 71 goes to a below-mentioned step S33 to print the target pixel only with the reference color.

When the marker flag of the target pixel is set OFF (S30: No), the CPU 71 determines whether the hue of the target pixel is within the specific hue range for the emphasis color (red), based on whether ΔH is equal to or less than the threshold T1 (S31). When ΔH is more than the threshold T1 (S31: No), the hue of the target pixel is out of the specific hue range. In this case, the CPU 71 goes to S33 to print the target pixel only with the reference color. When ΔH is equal to or less than the threshold T1 (S31: Yes), the hue of the target pixel is within the specific hue range. In this case, the CPU 71 goes to S32 to print the target pixel with the emphasis color.

The CPU 71 calculates a K value and an M value of the target pixel based on the following expressions (7) and (8), respectively (S32).

$$K = 1 - V \quad (7)$$

$$M = S \times (1 - \Delta H) \quad (8)$$

When the target pixel is printed with the emphasis color, the lightness of the target pixel is represented with the reference color. Therefore, even when the target pixel is printed with the emphasis color, the K value is set for the target pixel. As represented by the expression (7), the K value is obtained by subtracting the V value of the HSV data from 1. Further, as represented by the expression (8), the M value of the target pixel is obtained by multiplying the S value of the HSV data by a coefficient (1−ΔH). The coefficient (1−ΔH) depends on the difference value ΔH between the hue value (i.e., the H value) of the target pixel and the hue value (i.e., the Hr value) of the emphasis color. The CPU 71 stores the K value and the M value into the storage area for KM data. Thereafter, the CPU 71 goes to S34.

Meanwhile, when the target pixel is printed with the reference color, the CPU 71 calculates a K value and an M value of the target pixel based on the following expressions (9) and (10), respectively (S33).

$$K = 1 - (0.299R + 0.587G + 0.114B) \quad (9)$$

$$M = 0 \quad (10)$$

When the target pixel is printed with the reference color, a density value (i.e., a K value) of the reference color is obtained by subtracting, from 1, a luminance value determined based on the RGB data. Based on the expression (9), the CPU 71 calculates a luminance value by summing the R value, the G value, and the B value of the target pixel multiplied by respective coefficients. Further, the emphasis color is not used for dots to be printed with the reference color. Hence, as represented by the expression (10), an M value of the target pixel is 0 (i.e., the M value is not set). The CPU 71 stores the K value and the M value into the storage area for KM data. Thereafter, the CPU 71 goes to S34.

As shown in FIG. 10, in the HSV data of the color samples 91 (red), the leftmost tile and the rightmost tile represent the respective achromatic colors with no hue defined. Namely, the leftmost tile and the rightmost tile represent the respective achromatic colors to be printed with the reference color (black). Therefore, in each of the leftmost tile and the rightmost tile, a K value of the KM data is calculated based on the RGB data, and an M value is 0 (not set). The color samples 91 of which ΔH is 0 and equal to or less than the threshold T1, represent colors to be printed with the emphasis color (red). Thus, in each of the tiles (i.e., the second to eighth tiles from the left) other than the leftmost tile and the rightmost tile, a K value of the KM data is calculated based on the V value, and an M value is calculated based on the S value and ΔH.

As shown in FIG. 11, in the HSV data of the color samples 92 (pink), the leftmost tile and the rightmost tile represent the respective achromatic colors with no hue defined. Namely, the leftmost tile and the rightmost tile represent the respective achromatic colors to be printed with the reference color (black). Therefore, in each of the leftmost tile and the rightmost tile, a K value of the KM data is calculated based on the RGB data, and an M value is 0. In addition, pink is a color close to red. The color samples 92 of which ΔH is 0.08 and equal to or less than the threshold T1, represent colors to be printed with the emphasis color (red). Thus, in each of the tiles (i.e., the second to eighth tiles from the left) other than the leftmost tile and the rightmost tile, a K value of the KM data is calculated based on the V value, and an M value is calculated based on the S value and ΔH.

As shown in FIG. 12, in the HSV data of the color samples 93 (yellow), the leftmost tile and the rightmost tile represent the respective achromatic colors with no hue defined. Namely, the leftmost tile and the rightmost tile represent the respective achromatic colors to be printed with the reference color (black). Therefore, in each of the leftmost tile and the rightmost tile, a K value of the KM data is calculated based on the RGB data, and an M value is 0. Yellow is closer to red than purple is, but is farther from red than pink is. The color samples 93 of which ΔH is 0.17 and more than the threshold T1, represent colors to be printed with the reference color (black). Thus, in each of the second to eighth tiles from the left, a K value of the KM data is calculated based on the RGB data, and an M value is 0.

As shown in FIG. 13, in the HSV data of the color samples 94 (purple), the leftmost tile and the rightmost tile represent the respective achromatic colors with no hue defined.

Namely, the leftmost tile and the rightmost tile represent the respective achromatic colors to be printed with the reference color (black). Therefore, in each of the leftmost tile and the rightmost tile, a K value of the KM data is calculated based on the RGB data, and an M value is 0. Purple is farther from red than each of pink and yellow is. The color samples 94 of which ΔH is 0.25 and more than the threshold T1, represent colors to be printed with the reference color (black). Thus, in each of the second to eighth tiles from the left, a K value of the KM data is calculated based on the RGB data, and an M value is 0.

As shown in FIG. 6, after generating the KM data of the target pixel, the CPU 71 determines whether the subtractive color processing has been performed for all of the pixels forming the image data (S34). When determining that there is a pixel for which the subtractive color processing has not been performed (S34: No), the CPU 71 goes back to S21. In S21, the CPU 71 sets, to a target pixel, a pixel for which the subtractive color processing has not been performed, and continues to perform the subtractive color process. When having performed the subtractive color processing for all of the pixels forming the image data and completing generation of the KM data (S34: Yes), the CPU 71 returns to the main process (see FIG. 5) and goes to S9.

As shown in FIG. 5, the CPU 71 generates synthetic data that represents a subtractive color image with the number of colors reduced to two (e.g., red and black), based on the KM data (S9). When the hue of the target pixel is within the specific hue range for the emphasis color (i.e., red), the CPU 71 calculates RGB data based on an expression such as (R, G, B)=((1−K)×M, 1−M, 1−M). When the hue of the target pixel is out of the specific hue range for the emphasis color, the CPU 71 calculates RGB data based on an expression such as (R, G, B)=(1−K, 1−K, 1−K). The CPU 71 stores the calculated RGB data into the storage area for synthetic data.

The CPU 71 controls the monitor 81 to display the subtractive color image based on the synthetic data (S10). The user is allowed to change the specific hue range within which the printer 1 performs printing using the emphasis color, by performing an input operation to change the threshold T1 via the input device 82 while watching the subtractive color image displayed on the monitor 81. In response to accepting the user's input operation to change the threshold T1 via the input device 82 (S11: Yes), the CPU 71 stores into the RAM 73 the threshold T1 changed by the user. The CPU 71 goes back to S8 to perform the subtractive color process using the new threshold T1 (S8), and controls the monitor 81 to display a newly-synthesized subtractive color image (S9 and S10). When the user does not perform an input operation to change the threshold T1 (S11: No), the CPU 71 goes to S12.

The CPU 71 performs the gradation process for the KM data (S12). As shown in FIG. 8, in the gradation process, the CPU 71 sets, as a target color, a color (i.e., an unprocessed color) for which gradation processing has not been performed among the reference color and the emphasis color forming the KM data (S61). The CPU 71 sets, as a target pixel, a pixel (i.e., an unprocessed pixel) for which the gradation processing has not been performed among the pixels forming the KM data (S62).

The CPU 71 applies the dither matrix to the KM data, extracts a numerical value corresponding to the target pixel from the dither matrix, and sets the extracted value as the threshold T2 (S63). The CPU 71 determines whether a density value (a K value or an M value) of the target color of the target pixel is equal to or more than the threshold T2 (S64). When determining that the density value of the target color of the target pixel is equal to or more than the threshold T2 (S64: Yes), the CPU 71 sets a value (a DK value or a DM value) of the target color in the gradation data to 1 (S65). Thereafter, the CPU 71 goes to S67. When determining that the density value of the target color of the target pixel is less than the threshold T2 (S64: No), the CPU 71 sets a value (a DK value or a DM value) of the target color in the gradation data to 0 (S66). Thereafter, the CPU 71 goes to S67.

As shown in FIG. 10, in the KM data, the color samples 91 (red) represent colors to be printed with the reference color and the emphasis color. In each of the second to fourth tiles from the left, the K value of the KM data is more than 0 and less than 1. The DK value of the gradation data of the reference color (black) is set to 1 or 0 based on whether the K value is equal to or more than the threshold T2 extracted from the dither matrix applied to the KM data. In each tile, the number of dots represented by DK=1 per unit area is proportional to the K value. For instance, in a group of dots having a K value equal to 0.75, DK values of 75% dots are set to 1, while DK values of 25% dots are set to 0. In each of the second to fifth tiles from the left, the M value of the KM data is 1, and the DM value of the gradation data of the emphasis color (red) is set to 1. In each of the sixth to eighth tiles from the left, the M value of the KM data is more than 0 and less than 1. The DM value is set to 1 or 0 based on whether the M value is equal to or more than the threshold T2 extracted from the dither matrix applied to the KM data. In each tile, the number of dots represented by DM=1 per unit area is proportional to the M value. For instance, in a group of dots having an M value equal to 0.5, DM values of 50% dots are set to 1, while DM values of 50% dots are set to 0.

As shown in FIG. 11, in the KM data, the color samples 92 (pink) represent colors to be printed with the reference color and the emphasis color. In each of the second to fourth tiles from the left, the K value of the KM data is more than 0 and less than 1. The DK value of the gradation data of the reference color (black) is set to 1 or 0 based on whether the K value is equal to or more than the threshold T2 extracted from the dither matrix applied to the KM data. In each tile, the number of dots represented by DK=1 per unit area is proportional to the K value. In each of the second to eighth tiles from the left, the M value of the KM data is more than 0 and less than 1. The DM value is set to 1 or 0 based on whether the M value is equal to or more than the threshold T2 extracted from the dither matrix applied to the KM data. In each tile, the number of dots represented by DM=1 per unit area is proportional to the M value. A ratio of the dots having a DM value equal to 1 in the gradation data of the emphasis color (red) in the color samples 92 is less than a ratio of the dots having a DM value equal to 1 in the gradation data of the emphasis color (red) in the color samples 91.

As shown in FIG. 12, in the KM data, the color samples 93 (yellow) represent colors to be printed only with the reference color. In each of the second to eighth tiles from the left, the K value of the KM data is more than 0 and less than 1. The DK value of the gradation data of the reference color (black) is set to 1 or 0 based on whether the K value is equal to or more than the threshold T2 extracted from the dither matrix applied to the KM data. In each tile, the number of dots represented by DK=1 per unit area is proportional to the K value. Further, in every tile, the M value of the KM data is 0. Therefore, the DM value of the gradation data of the emphasis color (red) is set to 0.

As shown in FIG. 13, in the KM data, the color samples 94 (purple) represent colors to be printed only with the reference color. In each of the second to eighth tiles from the left, the K value of the KM data is more than 0 and less than 1. The DK value of the gradation data of the reference color (black) is set to 1 or 0 based on whether the K value is equal to or more than the threshold T2 extracted from the dither matrix applied to the KM data. In each tile, the number of dots represented by DK=1 per unit area is proportional to the K value. Further, in every tile, the M value of the KM data is 0. Therefore, the DM value of the gradation data of the emphasis color (red) is set to 0. A luminance of purple is lower than a luminance of yellow. Hence, a ratio of the dots having a DK value equal to 1 in the gradation data of the reference color (black) in the color samples 94 is more than a ratio of the dots having a DK value equal to 1 in the gradation data of the reference color (black) in the color samples 93.

As shown in FIG. 8, after generating the gradation data of the target pixel, the CPU 71 determines whether the gradation processing has been performed for all of the pixels forming the target color of the KM data (S67). When determining that there is a pixel (i.e., an unprocessed pixel) for which the gradation processing has not been performed (S67: No), the CPU 71 goes back to S62. In S62, the CPU 71 sets an unprocessed pixel as a target pixel and continues to perform the gradation process. When determining that the gradation processing has been completed for all of the pixels forming the target color of the KM data (S67: Yes), the CPU 71 determines whether the gradation processing has been performed for all of the colors forming the KM data (S68). When determining that there is a color (i.e., an unprocessed color) for which the gradation processing has not been performed (S68: No), the CPU 71 goes back to S61. In S61, the CPU 71 sets an unprocessed color as a target color and continues to perform the gradation process. When the gradation processing has been performed for all of the colors forming the KM data, and generation of the gradation data has been completed (S68: Yes), the CPU 71 returns to the main process (see FIG. 5) and goes to S13.

As shown in FIG. 5, the CPU 71 performs a ternarizing process for the gradation data (S13). As shown in FIG. 9, in the ternarizing process, the CPU 71 sets, as a target pixel, a pixel (i.e., an unprocessed pixel) for which ternarization has not been performed among the pixels forming the gradation data (881). The CPU 71 determines whether a DK value of the target pixel is 1 (S82). When determining that the DK value of the target pixel is 1 (S82: Yes), the CPU 71 sets a D value of the target pixel in the print data to 2 (S83). Afterward, the CPU 71 goes to S87.

When determining that the DK value of the target pixel is 0 (S82: No), the CPU 71 determines whether a DM value of the target pixel is 1 (S84). When determining that the DM value of the target pixel is 1 (S84: Yes), the CPU 71 sets the D value of the target pixel in the print data to 1 (S85). Afterward, the CPU 71 goes to S87. When determining that the DM value of the target pixel is 0 (S84: No), the CPU 71 sets the D value of the target pixel in the print data to 0 (S86). Afterward, the CPU 71 goes to S87.

As shown in FIG. 10, in the gradation data of the leftmost tile of the color samples 91 (red), the DK value is 1. Each of dots represented by DK=1 is printed with the reference color (black) no matter what the DM value is. Hence, D values of such dots are set to 2. Each of the second to fourth tiles from the left has a mixture of dots having a DK value equal to 1 and dots having a DK value equal to 0 at a mixture ratio according to the K value of the KM data. In each of the second to fourth tiles from the left, every dot has a DM value equal to 1. Therefore, in the print data of each of the second to fourth tiles from the left, D values of dots existing at an existence ratio proportional to the K value are set to 2, while D values of the remaining dots are set to 1. The fifth tile from the left has a DK value equal to 0 and a DM value equal to 1. Thus, a D value of the tile is set to 1. In each of the sixth to eighth tiles from the left, every dot has a DK value equal to 0. Further, each of the sixth to eighth tiles from the left has a mixture of dots having a DM value equal to 1 and dots having a DM value equal to 0 at a mixture ratio according to the M value of the KM data. D values of the dots having a DM value equal to 1 are set to 1. To the dots having a DM value equal to 0, for instance, the color (white) of the base material layer 37 of the sheet 3A is applied. Therefore, the dots having a DM value equal to 0 are regarded as dots not to be printed, and D values of the dots are set to 0. In the gradation data of the rightmost tile, both of the DK value and the DM value are equal to 0. Thus, in the print data, the D value of the rightmost tile is set to 0.

As shown in FIG. 11, in the gradation data of the leftmost tile of the color samples 92 (pink), the DK value is 1. Therefore, the D value of the print data of the leftmost tile is set to 2. Each of the second to fourth tiles from the left has a mixture of dots having a DK value equal to 1 and dots having a DK value equal to 0 at a mixture ratio according to the K value. Further, each of the second to fourth tiles from the left has a mixture of dots having a DM value equal to 1 and dots having a DM value equal to 0 at a mixture ratio according to the M value. Hence, in the print data of each of the second to fourth tiles from the left, D values of dots existing at an existence ratio proportional to the K value are set to 2. Further, D values of dots existing at an existence ratio proportional to the M value among the remaining dots are set to 1. Moreover, D values of the other dots are set to 0. In each of the fifth to eighth tiles from the left, the DK value is 0. Further, each of the fifth to eighth tiles from the left has a mixture of dots having a DM value equal to 1 and dots having a DM value equal to 0 at a mixture ratio according to the M value. Therefore, in the print data of each of the fifth to eighth tiles from the left, D values of dots existing at an existence ratio proportional to the M value are set to 1, while D values of the remaining dots are set to 0. In the gradation data of the rightmost tile, both of the DK value and the DM value are 0. Thus, in the print data, the D value of the rightmost tile is set to 0.

As shown in FIG. 12, in the gradation data of the leftmost tile of the color samples 93 (yellow), the DK value is 1. Therefore, the D value of the print data of the leftmost tile is set to 2. Each of the second to eighth tiles from the left has a mixture of dots having an DK value equal to 1 and dots having an DK value equal to 0 at a mixture ratio according to the K value. Therefore, in the print data of each of the second to eighth tiles from the left, D values of dots existing at an existence ratio proportional to the K value are set to 2, while D values of the remaining dots are set to 0. In the gradation data of the rightmost tile, both of the DK value and the DM value are 0. Thus, in the print data, the D value of the rightmost tile is set to 0. In the print data, there exists no dot having a D value equal to 1.

As shown in FIG. 13, in the gradation data of the leftmost tile of the color samples 94 (purple), the DK value is 1. Therefore, the D value of the print data of the leftmost tile is set to 2. Each of the second to eighth tiles from the left has a mixture of dots having an DK value equal to 1 and dots having an DK value equal to 0 at a mixture ratio according to the K value. Therefore, in the print data of each of the second to eighth tiles from the left, D values of dots existing at an existence ratio proportional to the K value are set to 2, while D values of the remaining dots are set to 0. In the gradation data of the rightmost tile, both of the DK value and the DM value are 0. Thus, in the print data, the D value of the rightmost tile is set to 0. In the print data, there exists no dot having a D value equal to 1.

As shown in FIG. 9, after generating the print data of the target pixel, the CPU 71 determines whether the ternarization has been performed for all of the pixels forming the gradation data (S87). When determining that there is a pixel (i.e., an unprocessed pixel) for which the ternarization has not been performed (S87: No), the CPU 71 goes back to S81. In S81, the CPU 71 sets an unprocessed pixel as a target pixel, and continues to perform the ternarizing process. When having performed the ternarization for all of the pixels forming the gradation data and completing generation of the print data (S87: Yes), the CPU 71 returns to the main process (see FIG. 5) and goes to S14.

As shown in FIG. 5, the CPU 71 completes the print data by adding control commands to the print data generated in the ternarization process, and transmits the print data to the printer 1 (S14). The CPU 71 terminates execution of the driver program 77B. In response to receiving the print data, the CPU 51 of the printer 1 generates print command data corresponding to the D values. The CPU 51 performs printing on the sheet 3A by forming dots with the reference color or the emphasis color on a line-by-line basis while conveying the sheet 3A.

As described above, with respect to a target pixel, when the hue (H) value of the target pixel is within the specific hue range for the emphasis color, the CPU 71 executing the driver program 77B determines a density (i.e., a K value of the KM data) of the reference color based on the value (V) value of the target pixel and determines a density (i.e., an M value of KM data) of the emphasis color based on the saturation (S) value of the target pixel and the difference value ($\Delta H$) between the hue (H) value of the target pixel and the hue value of the emphasis color. Meanwhile, when the hue (H) value of the target pixel is out of the specific hue range for the emphasis color, the CPU 71 executing the driver program 77B determines a density (i.e., a K value of the KM data) of the reference color based on a luminance value derived from the RGB data of the target pixel and sets a density (i.e., an M value of KM data) of the emphasis color to 0. Therefore, the CPU 71 is enabled to generate print data such that an image printed based on the print data makes the user feel less sense of incongruity than a grayscale printed image. Further, as an area has a higher saturation and a higher value (lightness) of the emphasis color, the area is less likely to include the reference color. Hence, the CPU 71 is enabled to generate such print data that an image printed based thereon shows, in an emphasized manner, an area solidly painted with the emphasis color.

The CPU 71 executing the driver program 77B sets the reference color and the emphasis color as respective candidate colors (DK, DM) in accordance with results of comparisons, with the threshold T2, of respective density values (K. M) of the reference color and the emphasis color, with respect to each pixel. Therefore, in a boundary area between different colors, there are mixed pixels for which the reference color is set as a candidate color and pixels for which the emphasis color is set as a candidate color. Thereby, the boundary area is made inconspicuous. Thus, the CPU 71 is enabled to generate print data such that an image printed based on the print data makes the user feel less sense of incongruity than a grayscale printed image.

When each of the reference color and the emphasis color is set as a candidate color for the same pixel, the CPU 71 executing the driver program 77B prioritizes the reference color. Thereby, it is possible to set a total color tone of a printed image based on the reference color. Thus, the CPU 71 is enabled to generate print data such that an image printed based on the print data makes the user feel less sense of incongruity than a grayscale printed image.

The CPU 71 executing the driver program 77B obtains the threshold T1 and compares the difference value ($\Delta H$) with the threshold T1. The CPU 71 may obtain, as the threshold T1, a value set by the user in initial settings for the driver program 77B or a specified value stored in the ROM 72. When obtaining the threshold T1 set by the user, the CPU 71 is allowed to generate print data such that an image printed based on the print data makes the user feel less sense of incongruity than a grayscale printed image. Further, as executed in the steps S8 to S11 of the illustrative embodiment, the CPU 71 may display, e.g., on the monitor 81, sample images that show within-range colors (i.e., colors within the specific hue range for the emphasis color) using the emphasis color and show out-of-range colors (i.e., colors out of the specific hue range for the emphasis color) only with the reference color. When a new threshold T1 is input by a user's operation, the CPU 71 may again separate the within-range colors and the out-of-range colors on the basis of the new threshold T1 and again display sample images on the monitor 81. The CPU 71 may obtain a threshold T1 input by the user's last operation and use the obtained threshold T1 to separate the within-range colors and the out-of-range colors in the subtractive color process.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

Modifications

In the aforementioned illustrative embodiment, the CPU 71 of the PC 70 generates print data by executing the driver program 77B stored in the HDD 77. Nonetheless, a program substantially equivalent to the driver program 77B may be stored in a memory (e.g., the ROM 52 and the flash memory 54) of the printer 1. In this case, the CPU 51 of the printer 1, executing the equivalent program, may process print data (which may, in this case, be original full-color data including control commands) received from the PC 70 via the USB cable or from a mobile terminal device via wireless communication. Thereby, the CPU 51 may generate subtractive color print data with the number of colors reduced to two (i.e., reference color and emphasis color) and perform printing based on the generated print data.

In the aforementioned illustrative embodiment, a heat-sensitive type thermal printer has been exemplified as the printer 1. Nonetheless, the printer 1 may be a heat transfer type thermal printer. In addition, various types of printers such as inkjet printers and laser printers may be employed as the printer 1. Further the subtractive color process by the driver program 77B may be applied, e.g., to a process by a display controller to control a display device such as a color electronic paper to display a subtractive color image based on original data.

In the aforementioned illustrative embodiment, red color has been exemplified as the emphasis color. Nonetheless, the emphasis color is not limited to a single color. There may be two or more emphasis colors defined. Further, the reference color is not limited to an achromatic color (gray) but may be a chromatic color. The threshold T2 may be different between that for the reference color and that for the emphasis color. Further, when there are two or more emphasis colors defined, the threshold T2 may be appropriately set to a specific value for each emphasis color.

In the steps S4 to S7, the CPU 71 performs processing to change colors within the specific hue range for red to black only for the lip part detected in the face detecting process. Nonetheless, the target to be detected in the face detecting process is not limited to the lip part. Further, the CPU 71 may set a lip part by a user's input operation to specifying a corresponding range without relying on the face detecting process. When colors of pixels within the range specified by the user is out of the specific hue range, the CPU 71 may determine luminance values of the colors and set the luminance values to density values of the emphasis color, thereby printing an arbitrary portion with the emphasis color. Further, the processing to modify the lip part in the steps S4 to S7 may be omitted.

In the aforementioned illustrative embodiment, in the steps S8 to S11, the CPU 71 displays a sample image based on the KM data generated via the subtractive color process for the image data, and accepts a user operation to change the threshold T1. The CPU 71 may change the threshold T1 in response to accepting a user operation to specify a hue range via a slider or a keyboard. Further, accepting the user's input operation to change the threshold T1 may be omitted. Further, when hue values of pixels forming the lip part detected in the aforementioned face detecting process are included in the specific hue range within which the printer 1 performs printing using the emphasis color, the CPU 71 may change the threshold T1 to exclude the hue values of the pixels forming the detected lip part from the specific hue range newly set by changing the threshold T1.

In the aforementioned illustrative embodiment, the specific hue range for the emphasis color has the same range on each of a positive side and a negative side with respect to the hue value of the emphasis color as a center. However, the specific hue range for the emphasis color may have different ranges between the positive side and the negative side with respect to the hue value of the emphasis color. For instance, the specific hue range for red (H=0) may be set as a range from (H−0.1) to (H+0.15).

In the aforementioned illustrative embodiment, the expressions (1) to (5) are used in the HSV conversion process. Nonetheless, other known converting expressions may be used.

In the aforementioned illustrative embodiment, the CPU 71 sets the threshold T2 using the dither method in the gradation process. Nonetheless, the threshold T2 may be set using a known error diffusion method. Further, the dither method is not limited to a method using a Bayer-type dither matrix but may be a method using a value determined at random within a range from 0 to 1 as a threshold, or a method (simple binarization) using a fixed value as a threshold. In the case where a fixed value is used, the threshold T2 may be appropriately set as needed by the user.

What is claimed is:

1. A print data generator comprising:
    a processor; and
    a storage storing processor-executable instructions configured to, when executed by the processor, cause the processor to perform a print data generating process to generate print data from original full-color data, the print data being expressed with a smaller number of colors including a reference color and an emphasis color, than the original full-color data, the emphasis color being a chromatic color different from the reference color, the print data generating process comprising:
        setting one of pixels forming the original full-color data as a target pixel;
        converting RGB data representing a color of the target pixel into HSV data;
        calculating a difference value between a hue value of the target pixel in the HSV data and a hue value of the emphasis color;
        determining whether the hue value of the target pixel is within a specific hue range for the emphasis color, based on the calculated difference value;
        in response to determining that the hue value of the target pixel is within the specific hue range for the emphasis color, setting a density value of the reference color of the target pixel based on a value value of the target pixel in the HSV data, and setting a density of the emphasis color of the target pixel based on a saturation value of the target pixel in the HSV data and the calculated difference value; and
        in response to determining that the hue value of the target pixel is out of the specific hue range for the emphasis color, setting the density value of the reference color of the target pixel based on a luminance value of the target pixel derived from the RGB data, and setting the density value of the emphasis color of the target pixel to zero.

2. The print data generator according to claim 1,
    wherein the print data generating process further comprises:
        determining whether the density value of the reference color of the target pixel is equal to or more than a particular threshold;
        in response to determining that the density value of the reference color of the target pixel is equal to or more than the particular threshold, setting the reference color as a first candidate for a color of the target pixel in the print data;
        determining whether the density value of the emphasis color of the target pixel is equal to or more than the particular threshold; and
        in response to determining that the density value of the emphasis color of the target pixel is equal to or more than the particular threshold, setting the emphasis color as a second candidate for the color of the target pixel in the print data.

3. The print data generator according to claim 2,
    wherein the print data generating process further comprises:

determining whether the reference color is set as the first candidate for the color of the target pixel in the print data;

in response to determining that the reference color is set as the first candidate for the color of the target pixel in the print data, setting the reference color as the color of the target pixel in the print data;

in response to determining that the reference color is not set as the first candidate for the color of the target pixel in the print data, determining whether the emphasis color is set as the second candidate for the color of the target pixel in the print data; and in response to determining that the emphasis color is set as the second candidate for the color of the target pixel in the print data, setting the emphasis color as the color of the target pixel in the print data.

4. The print data generator according to claim 1, wherein the print data generating process further comprises:

obtaining a specific threshold;

determining whether the calculated difference value between the hue value of the target pixel in the HSV data and the hue value of the emphasis color is equal to or less than the specific threshold;

in response to determining that the calculated difference value between the hue value of the target pixel in the HSV data and the hue value of the emphasis color is equal to or less than the specific threshold, determining that the hue value of the target pixel is within the specific hue range for the emphasis color; and in response to determining that the calculated difference value between the hue value of the target pixel in the HSV data and the hue value of the emphasis color is more than the specific threshold, determining that the hue value of the target pixel is out of the specific hue range for the emphasis color.

5. A printer comprising:

a printing head configured to perform printing based on print data; and a print data generator configured to perform a print data generating process to generate the print data from original full-color data, the print data being expressed with a smaller number of colors including a reference color and an emphasis color, than the original full-color data, the emphasis color being a chromatic color different from the reference color, the print data generating process comprising:

setting one of pixels forming the original full-color data as a target pixel;

converting RGB data representing a color of the target pixel into HSV data;

calculating a difference value between a hue value of the target pixel in the HSV data and a hue value of the emphasis color;

determining whether the hue value of the target pixel is within a specific hue range for the emphasis color, based on the calculated difference value;

in response to determining that the hue value of the target pixel is within the specific hue range for the emphasis color, setting a density value of the reference color of the target pixel based on a value value of the target pixel in the HSV data, and setting a density of the emphasis color of the target pixel based on a saturation value of the target pixel in the HSV data and the calculated difference value; and in response to determining that the hue value of the target pixel is out of the specific hue range for the emphasis color, setting the density value of the reference color of the target pixel based on a luminance value of the target pixel derived from the RGB data, and setting the density value of the emphasis color of the target pixel to zero.

6. The printer according to claim 5, wherein the print data generating process further comprises:

determining whether the density value of the reference color of the target pixel is equal to or more than a particular threshold;

in response to determining that the density value of the reference color of the target pixel is equal to or more than the particular threshold, setting the reference color as a first candidate for a color of the target pixel in the print data;

determining whether the density value of the emphasis color of the target pixel is equal to or more than the particular threshold; and in response to determining that the density value of the emphasis color of the target pixel is equal to or more than the particular threshold, setting the emphasis color as a second candidate for the color of the target pixel in the print data.

7. The printer according to claim 6, wherein the print data generating process further comprises:

determining whether the reference color is set as the first candidate for the color of the target pixel in the print data;

in response to determining that the reference color is set as the first candidate for the color of the target pixel in the print data, setting the reference color as the color of the target pixel in the print data;

in response to determining that the reference color is not set as the first candidate for the color of the target pixel in the print data, determining whether the emphasis color is set as the second candidate for the color of the target pixel in the print data; and in response to determining that the emphasis color is set as the second candidate for the color of the target pixel in the print data, setting the emphasis color as the color of the target pixel in the print data.

8. The printer according to claim 5, wherein the print data generating process further comprises:

obtaining a specific threshold;

determining whether the calculated difference value between the hue value of the target pixel in the HSV data and the hue value of the emphasis color is equal to or less than the specific threshold;

in response to determining that the calculated difference value between the hue value of the target pixel in the HSV data and the hue value of the emphasis color is equal to or less than the specific threshold, determining that the hue value of the target pixel is within the specific hue range for the emphasis color; and in response to determining that the calculated difference value between the hue value of the target pixel in the HSV data and the hue value of the emphasis color is more than the specific threshold, determining that the hue value of the target pixel is out of the specific hue range for the emphasis color.

9. The printer according to claim 5,
wherein the print data generator comprises:
a processor; and
a memory storing processor-executable instructions configured to, when executed by the processor, cause the processor to perform the print data generating process.

10. A method implementable on a processor, for generating print data from original full-color data, the print data being expressed with a smaller number of colors including a reference color and an emphasis color, than the original full-color data, the emphasis color being a chromatic color different from the reference color, the method comprising:
setting one of pixels forming the original full-color data as a target pixel;
converting RGB data representing a color of the target pixel into HSV data;
calculating a difference value between a hue value of the target pixel in the HSV data and a hue value of the emphasis color;
determining whether the hue value of the target pixel is within a specific hue range for the emphasis color, based on the calculated difference value;
in response to determining that the hue value of the target pixel is within the specific hue range for the emphasis color, setting a density value of the reference color of the target pixel based on a value value of the target pixel in the HSV data, and setting a density of the emphasis color of the target pixel based on a saturation value of the target pixel in the HSV data and the calculated difference value; and
in response to determining that the hue value of the target pixel is out of the specific hue range for the emphasis color, setting the density value of the reference color of the target pixel based on a luminance value of the target pixel derived from the RGB data, and setting the density value of the emphasis color of the target pixel to zero.

11. The method according to claim 10, further comprising:
determining whether the density value of the reference color of the target pixel is equal to or more than a particular threshold;
in response to determining that the density value of the reference color of the target pixel is equal to or more than the particular threshold, setting the reference color as a first candidate for a color of the target pixel in the print data;
determining whether the density value of the emphasis color of the target pixel is equal to or more than the particular threshold; and
in response to determining that the density value of the emphasis color of the target pixel is equal to or more than the particular threshold, setting the emphasis color as a second candidate for the color of the target pixel in the print data.

12. The method according to claim 11, further comprising:
determining whether the reference color is set as the first candidate for the color of the target pixel in the print data;
in response to determining that the reference color is set as the first candidate for the color of the target pixel in the print data, setting the reference color as the color of the target pixel in the print data;
in response to determining that the reference color is not set as the first candidate for the color of the target pixel in the print data, determining whether the emphasis color is set as the second candidate for the color of the target pixel in the print data; and
in response to determining that the emphasis color is set as the second candidate for the color of the target pixel in the print data, setting the emphasis color as the color of the target pixel in the print data.

13. The method according to claim 10, further comprising:
obtaining a specific threshold;
determining whether the calculated difference value between the hue value of the target pixel in the HSV data and the hue value of the emphasis color is equal to or less than the specific threshold;
in response to determining that the calculated difference value between the hue value of the target pixel in the HSV data and the hue value of the emphasis color is equal to or less than the specific threshold, determining that the hue value of the target pixel is within the specific hue range for the emphasis color; and
in response to determining that the calculated difference value between the hue value of the target pixel in the HSV data and the hue value of the emphasis color is more than the specific threshold, determining that the hue value of the target pixel is out of the specific hue range for the emphasis color.

14. A non-transitory computer-readable medium storing computer-readable instructions configured to, when executed by a processor, cause the processor to perform a print data generating process to generate print data from original full-color data, the print data being expressed with a smaller number of colors including a reference color and an emphasis color, than the original full-color data, the emphasis color being a chromatic color different from the reference color, the print data generating process comprising:
setting one of pixels forming the original full-color data as a target pixel;
converting RGB data representing a color of the target pixel into HSV data;
calculating a difference value between a hue value of the target pixel in the HSV data and a hue value of the emphasis color;
determining whether the hue value of the target pixel is within a specific hue range for the emphasis color, based on the calculated difference value;
in response to determining that the hue value of the target pixel is within the specific hue range for the emphasis color, setting a density value of the reference color of the target pixel based on a value value of the target pixel in the HSV data, and setting a density of the emphasis color of the target pixel based on a saturation value of the target pixel in the HSV data and the calculated difference value; and
in response to determining that the hue value of the target pixel is out of the specific hue range for the emphasis color, setting the density value of the reference color of the target pixel based on a luminance value of the target pixel derived from the RGB data, and setting the density value of the emphasis color of the target pixel to zero.

15. The non-transitory computer-readable medium according to claim 14,
wherein the print data generating process further comprises:

determining whether the density value of the reference color of the target pixel is equal to or more than a particular threshold;

in response to determining that the density value of the reference color of the target pixel is equal to or more than the particular threshold, setting the reference color as a first candidate for a color of the target pixel in the print data;

determining whether the density value of the emphasis color of the target pixel is equal to or more than the particular threshold; and in response to determining that the density value of the emphasis color of the target pixel is equal to or more than the particular threshold, setting the emphasis color as a second candidate for the color of the target pixel in the print data.

16. The non-transitory computer-readable medium according to claim 15, wherein the print data generating process further comprises:

determining whether the reference color is set as the first candidate for the color of the target pixel in the print data;

in response to determining that the reference color is set as the first candidate for the color of the target pixel in the print data, setting the reference color as the color of the target pixel in the print data;

in response to determining that the reference color is not set as the first candidate for the color of the target pixel in the print data, determining whether the emphasis color is set as the second candidate for the color of the target pixel in the print data; and in response to determining that the emphasis color is set as the second candidate for the color of the target pixel in the print data, setting the emphasis color as the color of the target pixel in the print data.

17. The non-transitory computer-readable medium according to claim 14, wherein the print data generating process further comprises:

obtaining a specific threshold;

determining whether the calculated difference value between the hue value of the target pixel in the HSV data and the hue value of the emphasis color is equal to or less than the specific threshold;

in response to determining that the calculated difference value between the hue value of the target pixel in the HSV data and the hue value of the emphasis color is equal to or less than the specific threshold, determining that the hue value of the target pixel is within the specific hue range for the emphasis color; and in response to determining that the calculated difference value between the hue value of the target pixel in the HSV data and the hue value of the emphasis color is more than the specific threshold, determining that the hue value of the target pixel is out of the specific hue range for the emphasis color.

* * * * *